US011442709B2

(12) United States Patent
Chirca et al.

(10) Patent No.: US 11,442,709 B2
(45) Date of Patent: *Sep. 13, 2022

(54) NESTED LOOP CONTROL

(71) Applicant: TEXAS INSTRUMENTS INCORPORATED, Dallas, TX (US)

(72) Inventors: Kai Chirca, Dallas, TX (US); Timothy D. Anderson, University Park, TX (US); Todd T. Hahn, Sugar Land, TX (US); Alan L. Davis, Sugar Land, TX (US)

(73) Assignee: Texas Instmments Incorporated, Dallas, TX (US)

( * ) Notice: Subject to any disclaimer, the term of this patent is extended or adjusted under 35 U.S.C. 154(b) by 50 days.

This patent is subject to a terminal disclaimer.

(21) Appl. No.: 16/983,429

(22) Filed: Aug. 3, 2020

(65) Prior Publication Data

US 2020/0371762 A1 Nov. 26, 2020

Related U.S. Application Data

(63) Continuation of application No. 16/422,845, filed on May 24, 2019, now Pat. No. 10,732,945.

(51) Int. Cl.
*G06F 8/41* (2018.01)
*G06F 5/06* (2006.01)
*G06F 9/30* (2018.01)
(52) U.S. Cl.
CPC ............... *G06F 8/433* (2013.01); *G06F 5/06* (2013.01); *G06F 9/30065* (2013.01)

(58) Field of Classification Search
CPC ............ G06F 9/30065; G06F 9/30072; G06F 9/30076; G06F 8/4441; G06F 8/433; G06F 5/06
See application file for complete search history.

(56) References Cited

U.S. PATENT DOCUMENTS

| 4,156,920 | A  |   | 5/1979  | Winograd |
|-----------|----|---|---------|----------|
| 5,473,557 | A  | * | 12/1995 | Harrison ................. G06F 17/10 |
|           |    |   |         | 708/520 |
| 5,958,048 | A  |   | 9/1999  | Babaian et al. |
| 6,029,002 | A  |   | 2/2000  | Afifi et al. |
| 6,192,515 | B1 |   | 2/2001  | Doshi et al. |
| 6,820,250 | B2 |   | 11/2004 | Muthukumar et al. |
| 10,339,057 | B2 |  | 7/2019  | Zbiciak |
| 10,732,945 | B1 | * | 8/2020  | Chirca ................... G06F 8/433 |
| 2003/0120905 | A1 | * | 6/2003 | Stotzer ................... G06F 9/325 |
|           |    |   |         | 712/241 |
| 2004/0015934 | A1 |  | 1/2004 | Muthukumar et al. |

(Continued)

*Primary Examiner* — Marina Lee
(74) *Attorney, Agent, or Firm* — Brian D. Graham; Charles A. Brill; Frank D. Cimino

(57) ABSTRACT

A method for compiling and executing a nested loop includes initializing a nested loop controller with an outer loop count value and an inner loop count value. The nested loop controller includes a predicate FIFO. The method also includes coalescing the nested loop and, during execution of the coalesced nested loop, causing the nested loop controller to populate the predicate FIFO and executing a get predicate instruction having an offset value, where the get predicate returns a value from the predicate FIFO specified by the offset value. The method further includes predicating an outer loop instruction on the returned value from the predicate FIFO.

20 Claims, 11 Drawing Sheets

(56) References Cited

U.S. PATENT DOCUMENTS

| | | | |
|---|---|---|---|
| 2005/0223380 A1* | 10/2005 | Chun | G06F 9/4843 |
| | | | 718/102 |
| 2008/0114975 A1* | 5/2008 | Yen | G06F 9/30058 |
| | | | 712/233 |
| 2009/0217248 A1 | 8/2009 | Bently et al. | |
| 2014/0115302 A1* | 4/2014 | Higham | G06F 9/3887 |
| | | | 712/220 |
| 2016/0092230 A1* | 3/2016 | Chen | G06F 9/30065 |
| | | | 712/241 |
| 2018/0173528 A1 | 6/2018 | Zbiciak | |
| 2018/0276275 A1 | 9/2018 | Dou et al. | |
| 2018/0373509 A1 | 12/2018 | Zhang et al. | |

* cited by examiner

FIG. 14A-1

COALESCED, NOT SOFTWARE PIPELINED, USING NLC
SLOT  UNITLESS  .M1  .S2  .D1  .D2  .L1  .L2  .S2  .M1  INNER ITERATION  PREDICATE FIFO CONTENTS ITERATION 64-BIT REGISTER

| CYCLE | NLCINIT inner = 3, outer = 5, episkew = 0 | | | | | | | | |
|---|---|---|---|---|---|---|---|---|---|
| 0 TICK | | | | | | | 0 | 0 | 1000000000 |
| 1 | GETP offset 0, A4 | | | | | | | | |
| 2 | [A5] MVK 0, B0 | | | | | | | | |
| 3 | | | LDD *D0++, B1 | | | | | | |
| 4 | | | | | | | | | |
| 5 | | | | | | | | | |
| 6 | | | | | ADD B0, B1, B0 | GETP 2, A4 | | | |
| 7 | | | | [A4] STD B0, *D1++ | | | | | |
| 8 TICK | | | | | | | 1 | 1 | 0100000000 |
| 9 | GETP 0, A5 | | | | | | | | |
| 10 | [A5] MVK 0, B0 | | | | | | | | |
| 11 | | | LDD *D0++, B1 | | | | | | |
| 12 | | | | | | | | | |
| 13 | | | | | | | | | |
| 14 | | | | | ADD B0, B1, B0 | GETP 2, A4 | | | |
| 15 | | | | [A4] STD B0, *D1++ | | | | | |
| 16 TICK | | | | | | | 2 | 2 | 0010000000 |
| 17 | GETP 0, A5 | | | | | | | | |
| 18 | [A5] MVK 0, B0 | | | | | | | | |
| 19 | | | LDD *D0++, B1 | | | | | | |
| 20 | | | | | | | | | |
| 21 | | | | | | | | | |
| 22 | | | | | ADD B0, B1, B0 | GETP 2, A4 | | | |
| 23 | | | | [A4] STD B0, *D1++ | | | | | |
| 24 TICK | | | | | | | 0 | 3 | 1001000000 |
| 25 | GETP 0, A4 | | | | | | | | |
| 26 | [A5] MVK 0, B0 | | | | | | | | |

TO FIG. 14A-2

```
    FROM FIG. 14A-1
27
28          LDD *D0++, B1
29
30          ADD B0, B1, B0    GETP 2, A4
31                                       [A4] STD B0, *D1++       1    4 0100100000
32 TICK
33  GETP 0, A5
34          [A5] MVK 0, B0
35          LDD *D0++, B1
36
37
38          ADD B0, B1, B0    GETP 2, A4
39                                       [A4] STD B0, *D1++       2    5 0010010000
40 TICK
41  GETP 0, A5
42          [A5] MVK 0, B0
43          LDD *D0++, B1
44
45
46          ADD B0, B1, B0    GETP 2, A4
47                                       [A4] STD B0, *D1++       0    6 1001001000
48 TICK
49  GETP 0, A4
50          [A5] MVK 0, B0
51          LDD *D0++, B1
52
53
54          ADD B0, B1, B0    GETP 2, A4
55                                       [A4] STD *D1++, B0
```

1 == OUTER LOOP CODE   0 == DO NOT PERFORM OUTER LOOP CODE

FIG. 14A-2

COALESCED, SOFTWARE PIPELINED WITH NO EPILOG COLLAPSING, USING NLC

NLCINIT inner = 3, outer = 5, episkew = 0

| STATE | CYCLE | SLOT .M1 | UNITLESS .S2 | .D1 | .D2 | .L1 | .L2 | .B | ITERATION | PREDICATE FIFO CONTENTS 64-BIT REGISTER | ILC | RILCNT | OLC | episkew |
|---|---|---|---|---|---|---|---|---|---|---|---|---|---|---|
| prolog | 0 | TICK | | | | | | | 0 | 1000000000 | 2 | 2 | 4 | 0 |
| | 1 | TICK | GETP offset 0, A5 | | | | | | 1 | 0100000000 | 1 | 2 | 4 | 0 |
| | 2 | TICK | GETP 0, A5 | [A5] MVK 0, B0 | | | | | 2 | 0010000000 | 0 | 2 | 4 | 0 |
| | 3 | TICK | GETP 0, A5 | [A5] MVK 0, B0 | LDD *D0++, B1 | | | | 3 | 1001000000 | 2 | 2 | 3 | 0 |
| | 4 | TICK | GETP 0, A5 | [A5] MVK 0, B0 | LDD *D0++, B1 | | | | 4 | 0100100000 | 1 | 2 | 3 | 0 |
| | 5 | TICK | GETP 0, A5 | [A5] MVK 0, B0 | LDD *D0++, B1 | | | | 5 | 0010010000 | 0 | 2 | 3 | 0 |
| | 6 | TICK | GETP 0, A5 | [A5] MVK 0, B0 | LDD *D0++, B1 | ADD B0, B1, B0 | | | 6 | 1001001000 | 2 | 2 | 2 | 0 |
| kernel | 7 | TICK | GETP 0, A5 | [A5] MVK 0, B0 | LDD *D0++, B1 | ADD B0, B1, B0 | GETP 7, A4 | | 7 | 0100100100 | 1 | 2 | 2 | 0 |
| | 8 | TICK | GETP 0, A5 | [A5] MVK 0, B0 | LDD *D0++, B1 | ADD B0, B1, B0 | GETP 7, A4 | | 8 | 0010010010 | 0 | 2 | 2 | 0 |
| | 9 | TICK | GETP 0, A5 | [A5] MVK 0, B0 | LDD *D0++, B1 | ADD B0, B1, B0 | GETP 7, A4 | [A4] STD B0, *D1++ | BNL Kernel: | 9 | 1001001001 | 2 | 2 | 1 | 0 |
| | 10 | TICK | GETP 0, A5 | [A5] MVK 0, B0 | LDD *D0++, B1 | ADD B0, B1, B0 | GETP 7, A4 | [A4] STD B0, *D1++ | BNL Kernel: | 10 | 0100100100 | 1 | 2 | 1 | 0 |
| | 11 | TICK | GETP 0, A5 | [A5] MVK 0, B0 | LDD *D0++, B1 | ADD B0, B1, B0 | GETP 7, A4 | [A4] STD B0, *D1++ | BNL Kernel: | 11 | 0010010010 | 0 | 2 | 1 | 0 |
| | 12 | TICK | GETP 0, A5 | [A5] MVK 0, B0 | LDD *D0++, B1 | ADD B0, B1, B0 | GETP 7, A4 | [A4] STD B0, *D1++ | BNL Kernel: | 12 | 1001001001 | 2 | 2 | 0 | 0 |
| | 13 | TICK | GETP 0, A5 | [A5] MVK 0, B0 | LDD *D0++, B1 | ADD B0, B1, B0 | GETP 7, A4 | [A4] STD B0, *D1++ | BNL Kernel: | 13 | 0100100100 | 1 | 2 | 0 | 0 |
| | 14 | TICK | GETP 0, A5 | [A5] MVK 0, B0 | LDD *D0++, B1 | ADD B0, B1, B0 | GETP 7, A4 | [A4] STD B0, *D1++ | BNL Kernel: | 14 | 0010010010 | 0 | 2 | 0 | 0 |
| epilog | 15 | | GETP 0, A5 | [A5] MVK 0, B0 | LDD *D0++, B1 | ADD B0, B1, B0 | GETP 7, A4 | [A4] STD B0, *D1++ | | 15 | 0001001001 | 0 | 2 | 0 | 0 |
| | 16 | | | [A5] MVK 0, B0 | LDD *D0++, B1 | ADD B0, B1, B0 | GETP 7, A4 | [A4] STD B0, *D1++ | | 16 | 0000100100 | 0 | 2 | 0 | 0 |
| | 17 | | | | LDD *D0++, B1 | ADD B0, B1, B0 | GETP 7, A4 | [A4] STD B0, *D1++ | | 17 | 0000010010 | 0 | 2 | 0 | 0 |
| | 18 | | | | | ADD B0, B1, B0 | GETP 7, A4 | [A4] STD B0, *D1++ | | 18 | 0000001001 | 0 | 2 | 0 | 0 |
| | 19 | | | | | | GETP 7, A4 | [A4] STD B0, *D1++ | | 19 | 0000000100 | 0 | 2 | 0 | 0 |
| | 20 | | | | | | | [A4] STD B0, *D1++ | | 20 | 0000000010 | 0 | 2 | 0 | 0 |
| finished | 21 | | | | | | | | | 21 | 0000000001 | | | | |

1 = OUTER LOOP CODE   0 = DO NOT PERFORM OUTER LOOP CODE

FIG. 14B

COALESCED, SOFTWARE PIPELINED WITH FULL EPILOG COLLAPSING, USING NLC

NLCINIT inner = 3, outer = 5, episkew = 7

| STATE | CYCLE | SLOT .M1 | .S2 | .D1 | .L2 | .L1 | .D2 | .B | PREDICATE FIFO CONTENTS ITERATION / 64-BIT REGISTER | ILC | RILCNT | OLC | episkew |
|---|---|---|---|---|---|---|---|---|---|---|---|---|---|
| prolog | 0 | TICK | | | | | | | 0  1000800000 | 2 | 2 | 4 | 7 |
| | 1 | TICK | GETP offset 0, A5 | | | | | | 1  0100800000 | 1 | 2 | 4 | 7 |
| | 2 | TICK | GETP 0,A5 | [A5] MVK 0, B0 | | | | | 2  0010800000 | 0 | 2 | 4 | 7 |
| | 3 | TICK | GETP 0,A5 | [A5] MVK 0, B0 | LDD *D0++, B1 | | | | 3  1001800000 | 2 | 2 | 3 | 7 |
| | 4 | TICK | GETP 0,A5 | [A5] MVK 0, B0 | LDD *D0++, B1 | | | | 4  0100100000 | 1 | 2 | 3 | 7 |
| | 5 | TICK | GETP 0,A5 | [A5] MVK 0, B0 | LDD *D0++, B1 | | | | 5  0010010000 | 0 | 2 | 3 | 7 |
| | 6 | TICK | GETP 0,A5 | [A5] MVK 0, B0 | LDD *D0++, B1 | ADD B0, B1, B0 | GETP 7, A4 | | 6  1001001000 | 2 | 2 | 2 | 7 |
| kernel | 7 | TICK | GETP 0,A5 | [A5] MVK 0, B0 | LDD *D0++, B1 | ADD B0, B1, B0 | GETP 7, A4 | | BNL Kernel | 7  0100100100 | 1 | 2 | 2 | 7 |
| | 8 | TICK | GETP 0,A5 | [A5] MVK 0, B0 | LDD *D0++, B1 | ADD B0, B1, B0 | GETP 7, A4 | | BNL Kernel | 8  0010010010 | 0 | 2 | 2 | 7 |
| | 9 | TICK | GETP 0,A5 | [A5] MVK 0, B0 | LDD *D0++, B1 | ADD B0, B1, B0 | GETP 7, A4 | [A4] STD B0, *D1++ | BNL Kernel | 9  1001001001 | 2 | 2 | 1 | 7 |
| | 10 | TICK | GETP 0,A5 | [A5] MVK 0, B0 | LDD *D0++, B1 | ADD B0, B1, B0 | GETP 7, A4 | [A4] STD B0, *D1++ | BNL Kernel | 10  0100100100 | 1 | 2 | 1 | 7 |
| | 11 | TICK | GETP 0,A5 | [A5] MVK 0, B0 | LDD *D0++, B1 | ADD B0, B1, B0 | GETP 7, A4 | [A4] STD B0, *D1++ | BNL Kernel | 11  0010010010 | 0 | 2 | 1 | 7 |
| | 12 | TICK | GETP 0,A5 | [A5] MVK 0, B0 | LDD *D0++, B1 | ADD B0, B1, B0 | GETP 7, A4 | [A4] STD B0, *D1++ | BNL Kernel | 12  1001001001 | 2 | 2 | 0 | 7 |
| | 13 | TICK | GETP 0,A5 | [A5] MVK 0, B0 | LDD *D0++, B1 | ADD B0, B1, B0 | GETP 7, A4 | [A4] STD B0, *D1++ | BNL Kernel | 13  0100100100 | 1 | 2 | 0 | 7 |
| | 14 | TICK | GETP 0,A5 | [A5] MVK 0, B0 | LDD *D0++, B1 | ADD B0, B1, B0 | GETP 7, A4 | [A4] STD B0, *D1++ | BNL Kernel | 14  0010010010 | 0 | 2 | 0 | 7 |
| | 15 | TICK | GETP 0,A5 | [A5] MVK 0, B0 | LDD *D0++, B1 | ADD B0, B1, B0 | GETP 7, A4 | [A4] STD B0, *D1++ | BNL Kernel | 15  0001001001 | 0 | 2 | 0 | 6 |
| | 16 | TICK | GETP 0,A5 | [A5] MVK 0, B0 | LDD *D0++, B1 | ADD B0, B1, B0 | GETP 7, A4 | [A4] STD B0, *D1++ | BNL Kernel | 16  0000100100 | 0 | 2 | 0 | 5 |
| | 17 | TICK | GETP 0,A5 | [A5] MVK 0, B0 | LDD *D0++, B1 | ADD B0, B1, B0 | GETP 7, A4 | [A4] STD B0, *D1++ | BNL Kernel | 17  0000010010 | 0 | 2 | 0 | 4 |
| | 18 | TICK | GETP 0,A5 | [A5] MVK 0, B0 | LDD *D0++, B1 | ADD B0, B1, B0 | GETP 7, A4 | [A4] STD B0, *D1++ | BNL Kernel | 18  0000001001 | 0 | 2 | 0 | 3 |
| | 19 | TICK | GETP 0,A5 | [A5] MVK 0, B0 | LDD *D0++, B1 | ADD B0, B1, B0 | GETP 7, A4 | [A4] STD B0, *D1++ | BNL Kernel | 19  0000000100 | 0 | 2 | 0 | 2 |
| | 20 | TICK | GETP 0,A5 | [A5] MVK 0, B0 | LDD *D0++, B1 | ADD B0, B1, B0 | GETP 7, A4 | [A4] STD B0, *D1++ | BNL Kernel | 20  0000000010 | 0 | 2 | 0 | 1 |
| finished | 21 | TICK | GETP 0,A5 | [A5] MVK 0, B0 | LDD *D0++, B1 | ADD B0, B1, B0 | GETP 7, A4 | [A4] STD B0, *D1++ | BNL Kernel | 21  0000000001 | 0 | 2 | 0 | 0 |

1 = OUTER LOOP CODE    0 = DO NOT PERFORM OUTER LOOP CODE

1402

FIG. 14C

NESTED LOOP CONTROL

RELATED APPLICATIONS

This application is a continuation of and claims priority to U.S. patent application Ser. No. 16/422,845, filed May 24, 2019, which is incorporated by reference herein in its entirety.

BACKGROUND

Modern digital signal processors (DSP) face multiple challenges. DSPs often execute software that includes nested loops, which include an inner loop and one or more outer loops. In order to improve performance of a DSP, certain instructions may be executed in a pipelined fashion, in which multiple instructions are executed at the same time by different functional units of the DSP. However, executing nested loops in a pipelined fashion introduces difficulties in determining whether to execute an instruction associated with the one or more outer loops, for example determining a predicate for the instruction in an efficient manner.

SUMMARY

In accordance with at least one example of the disclosure, a method for compiling and executing a nested loop includes initializing a nested loop controller with an outer loop count value and an inner loop count value. The nested loop controller includes a predicate FIFO. The method also includes coalescing the nested loop and, during execution of the coalesced nested loop, causing the nested loop controller to populate the predicate FIFO and executing a get predicate instruction having an offset value, where the get predicate returns a value from the predicate FIFO specified by the offset value. The method further includes predicating an outer loop instruction on the returned value from the predicate FIFO.

In accordance with another example of the disclosure, a method includes for compiling a nested loop includes generating an initialization instruction to be executed prior to instructions of the nested loop. The initialization instruction is configured to initialize a nested loop controller with an outer loop count value and an inner loop count value, where the nested loop controller includes a predicate first FIFO. The method also includes coalescing the nested loop, resulting in at least one predicated instruction in the coalesced nested loop corresponding to an instruction in an outer loop of the nested loop; for each iteration of the coalesced nested loop, generating a tick instruction, the tick instruction configured to advance the inner loop count value and populate the predicate FIFO; and for each predicated instruction, generating a get predicate instruction comprising an offset value, where the get predicate instruction returns a value from the predicate FIFO specified by the offset value.

In accordance with yet another example of the disclosure, a system includes a compiler for a digital signal processor (DSP). The compiler is configured to generate an initialization instruction to be executed prior to instructions of the nested loop, the initialization instruction configured to initialize a nested loop controller with an outer loop count value and an inner loop count value, where the nested loop controller includes a predicate FIFO. The compiler is also configured to coalesce the nested loop, resulting in at least one predicated instruction in the coalesced nested loop corresponding to an instruction in an outer loop of the nested loop; for each iteration of the coalesced nested loop, generate a tick instruction, the tick instruction configured to advance the inner loop count value and populate the predicate FIFO; and for each predicated instruction, generate a get predicate instruction having an offset value, where the get predicate instruction returns a value from the predicate FIFO specified by the offset value.

BRIEF DESCRIPTION OF THE DRAWINGS

For a detailed description of various examples, reference will now be made to the accompanying drawings in which:

FIGS. 14A-1, 14A-2, 14B, and 14C show exemplary pseudo-assembly code instructions that result from compiling a coalesced nested loop in accordance with various examples.

DETAILED DESCRIPTION

In many typical DSP applications, loops comprise a majority of the number of cycles, or MIPS, and thus performance of loops can affect the performance of the entire application. As explained above, DSPs often execute software that includes nested loops, which include an inner loop and one or more outer loops. Some common examples are finite impulse response (FIR) and infinite impulse response (IIR) filters, fast Fourier transforms (FFTs), and vision code. A perfectly nested loop is a nested loop in which all of the instructions to be executed are contained only in the inner loop, and the outer loops contain no instructions beyond the loop itself to be executed. An imperfectly nested loop is a nested loop in which one or more of the outer loops contain instructions to be executed.

In order to improve performance of a DSP, certain instructions may be executed in a pipelined fashion, in which multiple instructions are executed at the same time by different functional units of the DSP. However, particularly with respect to imperfectly nested loops, executing such nested loops in a pipelined fashion introduces difficulties in determining whether to execute an instruction associated with the one or more outer loops, for example determining a predicate for the instruction in an efficient manner.

Examples of the present disclosure that address the foregoing include a nested loop controller that maintains an inner loop counter, an outer loop counter, and a predicate first-in, first-out buffer (FIFO) to improve pipelined execution of nested loops. Other examples include instructions for initializing the nested loop controller, controlling the nested loop controller during execution of a nested loop, and accessing the predicate FIFO during execution of a nested loop to determine whether a predicated instruction is executed in a particular cycle. Still other examples are directed to a compiler configured to compile a nested loop to leverage the functionality of the nested loop controller and associated instructions explained above.

Figure 1:
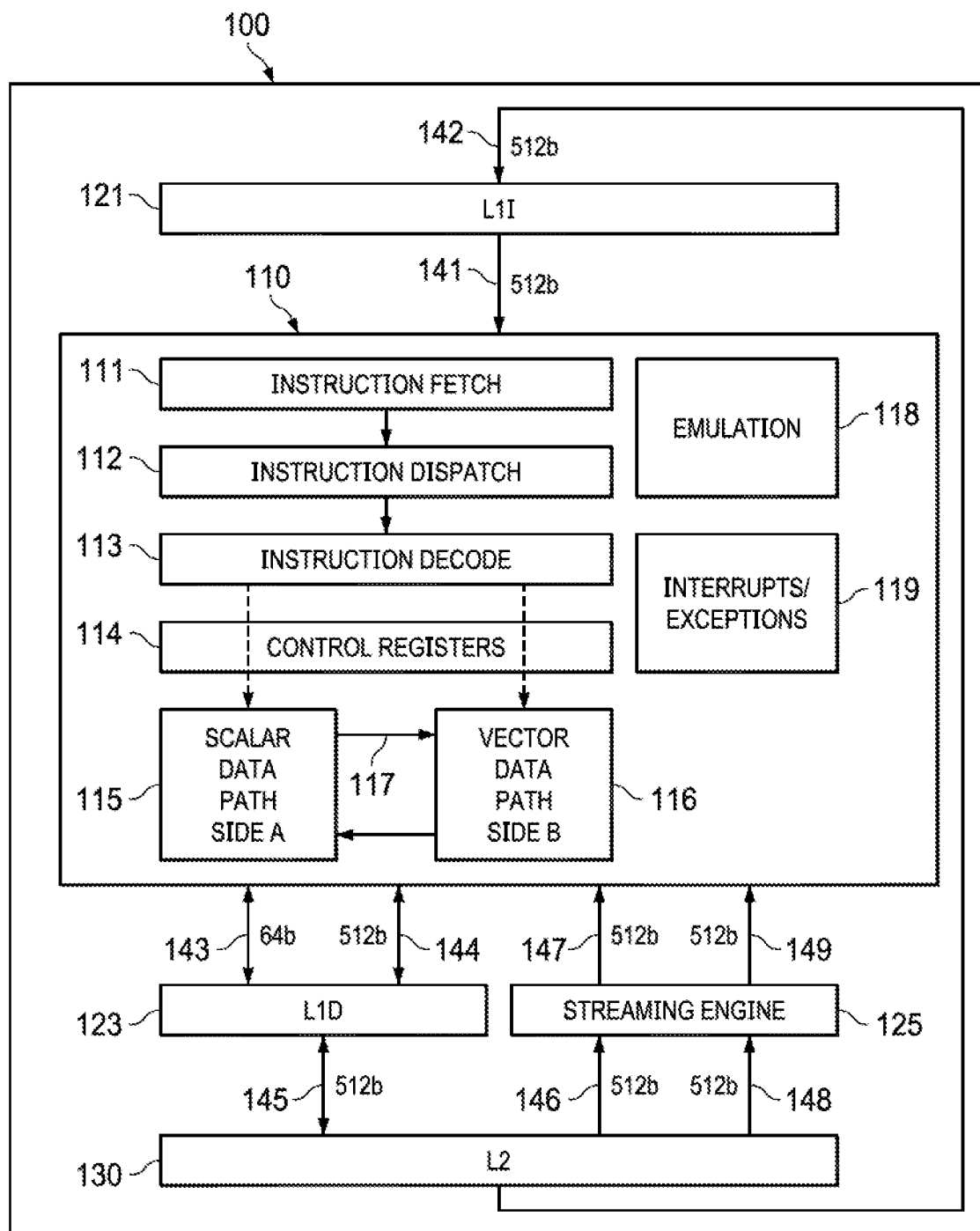
FIG. 1 shows a dual scalar/vector datapath processor in accordance with various examples.

FIG. 1 illustrates a dual scalar/vector datapath processor in accordance with various examples of this disclosure. Processor 100 includes separate level one instruction cache (L1I) 121 and level one data cache (L1D) 123. Processor 100 includes a level two combined instruction/data cache (L2) 130 that holds both instructions and data. FIG. 1 illustrates connection between level one instruction cache 121 and level two combined instruction/data cache 130 (bus 142). FIG. 1 illustrates connection between level one data cache 123 and level two combined instruction/data cache 130 (bus 145). In an example, processor 100 level two combined instruction/data cache 130 stores both instructions to back up level one instruction cache 121 and data to back up level one data cache 123. In this example, level two combined instruction/data cache 130 is further connected to higher level cache and/or main memory in a manner known in the art and not illustrated in FIG. 1. In this example, central processing unit core 110, level one instruction cache 121, level one data cache 123 and level two combined instruction/data cache 130 are formed on a single integrated circuit. This signal integrated circuit optionally includes other circuits.

Central processing unit core 110 fetches instructions from level one instruction cache 121 as controlled by instruction fetch unit 111. Instruction fetch unit 111 determines the next instructions to be executed and recalls a fetch packet sized set of such instructions. The nature and size of fetch packets are further detailed below. As known in the art, instructions are directly fetched from level one instruction cache 121 upon a cache hit (if these instructions are stored in level one instruction cache 121). Upon a cache miss (the specified instruction fetch packet is not stored in level one instruction cache 121), these instructions are sought in level two combined cache 130. In this example, the size of a cache line in level one instruction cache 121 equals the size of a fetch packet. The memory locations of these instructions are either a hit in level two combined cache 130 or a miss. A hit is serviced from level two combined cache 130. A miss is serviced from a higher level of cache (not illustrated) or from main memory (not illustrated). As is known in the art, the requested instruction may be simultaneously supplied to both level one instruction cache 121 and central processing unit core 110 to speed use.

In an example, central processing unit core 110 includes plural functional units to perform instruction specified data processing tasks. Instruction dispatch unit 112 determines the target functional unit of each fetched instruction. In this example, central processing unit 110 operates as a very long instruction word (VLIW) processor capable of operating on plural instructions in corresponding functional units simultaneously. Preferably a complier organizes instructions in execute packets that are executed together. Instruction dispatch unit 112 directs each instruction to its target functional unit. The functional unit assigned to an instruction is completely specified by the instruction produced by a compiler. The hardware of central processing unit core 110 has no part in this functional unit assignment. In this example, instruction dispatch unit 112 may operate on plural instructions in parallel. The number of such parallel instructions is set by the size of the execute packet. This will be further detailed below.

One part of the dispatch task of instruction dispatch unit 112 is determining whether the instruction is to execute on a functional unit in scalar datapath side A 115 or vector datapath side B 116. An instruction bit within each instruction called the s bit determines which datapath the instruction controls. This will be further detailed below.

Instruction decode unit 113 decodes each instruction in a current execute packet. Decoding includes identification of the functional unit performing the instruction, identification of registers used to supply data for the corresponding data processing operation from among possible register files and identification of the register destination of the results of the corresponding data processing operation. As further explained below, instructions may include a constant field in place of one register number operand field. The result of this decoding is signals for control of the target functional unit to perform the data processing operation specified by the corresponding instruction on the specified data.

Central processing unit core 110 includes control registers 114. Control registers 114 store information for control of the functional units in scalar datapath side A 115 and vector datapath side B 116. This information could be mode information or the like.

The decoded instructions from instruction decode 113 and information stored in control registers 114 are supplied to scalar datapath side A 115 and vector datapath side B 116. As a result functional units within scalar datapath side A 115 and vector datapath side B 116 perform instruction specified data processing operations upon instruction specified data and store the results in an instruction specified data register or registers. Each of scalar datapath side A 115 and vector datapath side B 116 includes plural functional units that preferably operate in parallel. These will be further detailed below in conjunction with FIG. 2. There is a datapath 117 between scalar datapath side A 115 and vector datapath side B 116 permitting data exchange.

Central processing unit core 110 includes further non-instruction based modules. Emulation unit 118 permits determination of the machine state of central processing unit core 110 in response to instructions. This capability will typically be employed for algorithmic development. Interrupts/exceptions unit 119 enables central processing unit core 110 to be responsive to external, asynchronous events (interrupts) and to respond to attempts to perform improper operations (exceptions).

Central processing unit core 110 includes streaming engine 125. Streaming engine 125 of this illustrated embodiment supplies two data streams from predetermined addresses typically cached in level two combined cache 130 to register files of vector datapath side B 116. This provides controlled data movement from memory (as cached in level two combined cache 130) directly to functional unit operand inputs. This is further detailed below.

FIG. 1 illustrates exemplary data widths of busses between various parts. Level one instruction cache 121 supplies instructions to instruction fetch unit 111 via bus 141. Bus 141 is preferably a 512-bit bus. Bus 141 is unidirectional from level one instruction cache 121 to central processing unit 110. Level two combined cache 130 supplies instructions to level one instruction cache 121 via bus 142. Bus 142 is preferably a 512-bit bus. Bus 142 is unidirectional from level two combined cache 130 to level one instruction cache 121.

Level one data cache 123 exchanges data with register files in scalar datapath side A 115 via bus 143. Bus 143 is preferably a 64-bit bus. Level one data cache 123 exchanges data with register files in vector datapath side B 116 via bus 144. Bus 144 is preferably a 512-bit bus. Busses 143 and 144 are illustrated as bidirectional supporting both central processing unit 110 data reads and data writes. Level one data cache 123 exchanges data with level two combined cache 130 via bus 145. Bus 145 is preferably a 512-bit bus. Bus 145 is illustrated as bidirectional supporting cache service for both central processing unit 110 data reads and data writes.

As known in the art, CPU data requests are directly fetched from level one data cache 123 upon a cache hit (if the requested data is stored in level one data cache 123). Upon a cache miss (the specified data is not stored in level one data cache 123), this data is sought in level two combined cache 130. The memory locations of this requested data is either a hit in level two combined cache 130 or a miss. A hit is serviced from level two combined cache 130. A miss is serviced from another level of cache (not illustrated) or from main memory (not illustrated). As is known in the art, the requested instruction may be simultaneously supplied to both level one data cache 123 and central processing unit core 110 to speed use.

Level two combined cache 130 supplies data of a first data stream to streaming engine 125 via bus 146. Bus 146 is preferably a 512-bit bus. Streaming engine 125 supplies data of this first data stream to functional units of vector datapath side B 116 via bus 147. Bus 147 is preferably a 512-bit bus. Level two combined cache 130 supplies data of a second data stream to streaming engine 125 via bus 148. Bus 148 is preferably a 512-bit bus. Streaming engine 125 supplies data of this second data stream to functional units of vector datapath side B 116 via bus 149. Bus 149 is preferably a 512-bit bus. Busses 146, 147, 148 and 149 are illustrated as unidirectional from level two combined cache 130 to streaming engine 125 and to vector datapath side B 116 in accordance with various examples of this disclosure.

Streaming engine 125 data requests are directly fetched from level two combined cache 130 upon a cache hit (if the requested data is stored in level two combined cache 130). Upon a cache miss (the specified data is not stored in level two combined cache 130), this data is sought from another level of cache (not illustrated) or from main memory (not illustrated). It is technically feasible in some examples for level one data cache 123 to cache data not stored in level two combined cache 130. If such operation is supported, then upon a streaming engine 125 data request that is a miss in level two combined cache 130, level two combined cache 130 should snoop level one data cache 123 for the stream engine 125 requested data. If level one data cache 123 stores this data its snoop response would include the data, which is then supplied to service the streaming engine 125 request. If level one data cache 123 does not store this data its snoop response would indicate this and level two combined cache 130 must service this streaming engine 125 request from another level of cache (not illustrated) or from main memory (not illustrated).

In an example, both level one data cache 123 and level two combined cache 130 may be configured as selected amounts of cache or directly addressable memory in accordance with U.S. Pat. No. 6,606,686 entitled UNIFIED MEMORY SYSTEM ARCHITECTURE INCLUDING CACHE AND DIRECTLY ADDRESSABLE STATIC RANDOM ACCESS MEMORY.

Figure 2:
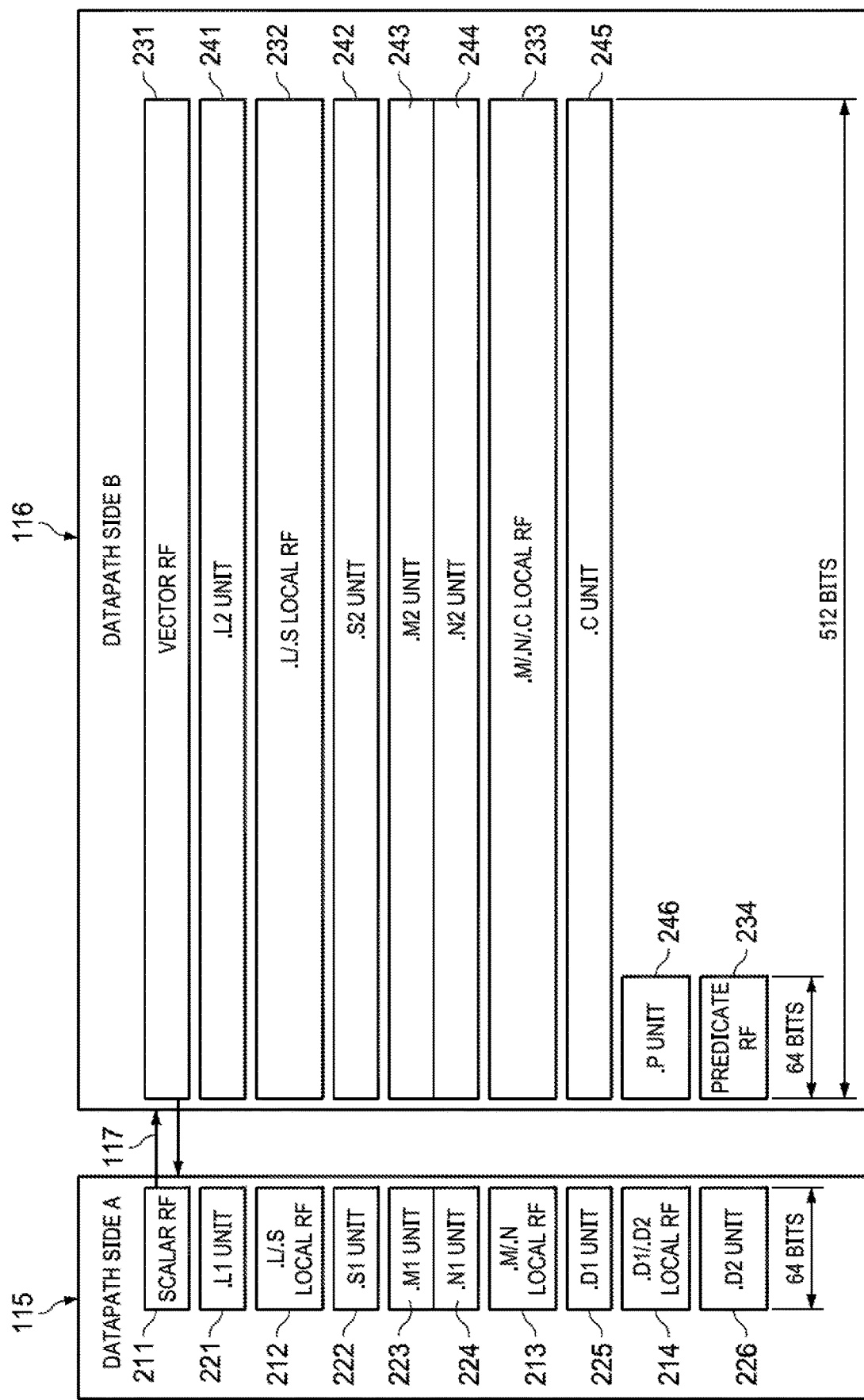
FIG. 2 shows the registers and functional units in the dual scalar/vector datapath processor illustrated in FIG. 1 and in accordance with various examples.

FIG. 2 illustrates further details of functional units and register files within scalar datapath side A 115 and vector datapath side B 116. Scalar datapath side A 115 includes global scalar register file 211, L1/S1 local register file 212, M1/N1 local register file 213 and D1/D2 local register file 214. Scalar datapath side A 115 includes L1 unit 221, S1 unit 222, M1 unit 223, N1 unit 224, D1 unit 225 and D2 unit 226. Vector datapath side B 116 includes global vector register file 231, L2/S2 local register file 232, M2/N2/C local register file 233 and predicate register file 234. Vector datapath side B 116 includes L2 unit 241, S2 unit 242, M2 unit 243, N2 unit 244, C unit 245 and P unit 246. There are limitations upon which functional units may read from or write to which register files. These will be detailed below.

Scalar datapath side A 115 includes L1 unit 221. L1 unit 221 generally accepts two 64-bit operands and produces one 64-bit result. The two operands are each recalled from an instruction specified register in either global scalar register file 211 or L1/S1 local register file 212. L1 unit 221 preferably performs the following instruction selected operations: 64-bit add/subtract operations; 32-bit min/max operations; 8-bit Single Instruction Multiple Data (SIMD) instructions such as sum of absolute value, minimum and maximum determinations; circular min/max operations; and various move operations between register files. The result may be written into an instruction specified register of global scalar register file 211, L1/S1 local register file 212, M1/N1 local register file 213 or D1/D2 local register file 214.

Scalar datapath side A 115 includes S1 unit 222. S1 unit 222 generally accepts two 64-bit operands and produces one 64-bit result. The two operands are each recalled from an instruction specified register in either global scalar register file 211 or L1/S1 local register file 212. S1 unit 222 preferably performs the same type operations as L1 unit 221. There optionally may be slight variations between the data processing operations supported by L1 unit 221 and S1 unit 222. The result may be written into an instruction specified register of global scalar register file 211, L1/S1 local register file 212, M1/N1 local register file 213 or D1/D2 local register file 214.

Scalar datapath side A 115 includes M1 unit 223. M1 unit 223 generally accepts two 64-bit operands and produces one 64-bit result. The two operands are each recalled from an instruction specified register in either global scalar register file 211 or M1/N1 local register file 213. M1 unit 223 preferably performs the following instruction selected operations: 8-bit multiply operations; complex dot product operations; 32-bit bit count operations; complex conjugate multiply operations; and bit-wise Logical Operations, moves, adds and subtracts. The result may be written into an instruction specified register of global scalar register file 211, L1/S1 local register file 212, M1/N1 local register file 213 or D1/D2 local register file 214.

Scalar datapath side A 115 includes N1 unit 224. N1 unit 224 generally accepts two 64-bit operands and produces one 64-bit result. The two operands are each recalled from an instruction specified register in either global scalar register file 211 or M1/N1 local register file 213. N1 unit 224 preferably performs the same type operations as M1 unit 223. There may be certain double operations (called dual issued instructions) that employ both the M1 unit 223 and the N1 unit 224 together. The result may be written into an instruction specified register of global scalar register file 211, L1/S1 local register file 212, M1/N1 local register file 213 or D1/D2 local register file 214.

Scalar datapath side A 115 includes D1 unit 225 and D2 unit 226. D1 unit 225 and D2 unit 226 generally each accept two 64-bit operands and each produce one 64-bit result. D1 unit 225 and D2 unit 226 generally perform address calculations and corresponding load and store operations. D1 unit 225 is used for scalar loads and stores of 64 bits. D2 unit 226 is used for vector loads and stores of 512 bits. D1 unit 225 and D2 unit 226 preferably also perform: swapping, pack and unpack on the load and store data; 64-bit SIMD arithmetic operations; and 64-bit bit-wise logical operations. D1/D2 local register file 214 will generally store base and offset addresses used in address calculations for the corresponding loads and stores. The two operands are each recalled from an instruction specified register in either global scalar register file 211 or D1/D2 local register file 214. The calculated result may be written into an instruction specified register of global scalar register file 211, L1/S1 local register file 212, M1/N1 local register file 213 or D1/D2 local register file 214.

Vector datapath side B 116 includes L2 unit 241. L2 unit 241 generally accepts two 512-bit operands and produces one 512-bit result. The two operands are each recalled from an instruction specified register in either global vector register file 231, L2/S2 local register file 232 or predicate register file 234. L2 unit 241 preferably performs instruction similar to L1 unit 221 except on wider 512-bit data. The result may be written into an instruction specified register of global vector register file 231, L2/S2 local register file 232, M2/N2/C local register file 233 or predicate register file 234.

Vector datapath side B 116 includes S2 unit 242. S2 unit 242 generally accepts two 512-bit operands and produces one 512-bit result. The two operands are each recalled from an instruction specified register in either global vector register file 231, L2/S2 local register file 232 or predicate register file 234. S2 unit 242 preferably performs instructions similar to S1 unit 222. The result may be written into an instruction specified register of global vector register file 231, L2/S2 local register file 232, M2/N2/C local register file 233 or predicate register file 234.

Vector datapath side B 116 includes M2 unit 243. M2 unit 243 generally accepts two 512-bit operands and produces one 512-bit result. The two operands are each recalled from an instruction specified register in either global vector register file 231 or M2/N2/C local register file 233. M2 unit 243 preferably performs instructions similar to M1 unit 223 except on wider 512-bit data. The result may be written into an instruction specified register of global vector register file 231, L2/S2 local register file 232 or M2/N2/C local register file 233.

Vector datapath side B 116 includes N2 unit 244. N2 unit 244 generally accepts two 512-bit operands and produces one 512-bit result. The two operands are each recalled from an instruction specified register in either global vector register file 231 or M2/N2/C local register file 233. N2 unit 244 preferably performs the same type operations as M2 unit 243. There may be certain double operations (called dual issued instructions) that employ both M2 unit 243 and the N2 unit 244 together. The result may be written into an instruction specified register of global vector register file 231, L2/S2 local register file 232 or M2/N2/C local register file 233.

Vector datapath side B 116 includes C unit 245. C unit 245 generally accepts two 512-bit operands and produces one 512-bit result. The two operands are each recalled from an instruction specified register in either global vector register file 231 or M2/N2/C local register file 233. C unit 245 preferably performs: "Rake" and "Search" instructions; up to 512 2-bit PN*8-bit multiplies I/Q complex multiplies per clock cycle; 8-bit and 16-bit Sum-of-Absolute-Difference (SAD) calculations, up to 512 SADs per clock cycle; horizontal add and horizontal min/max instructions; and vector permutes instructions. C unit 245 also contains 4 vector control registers (CUCR0 to CUCR3) used to control certain operations of C unit 245 instructions. Control registers CUCR0 to CUCR3 are used as operands in certain C unit 245 operations. Control registers CUCR0 to CUCR3 are preferably used: in control of a general permutation instruction (VPERM); and as masks for SIMD multiple DOT product operations (DOTPM) and SIMD multiple Sum-of-Absolute-Difference (SAD) operations. Control register CUCR0 is preferably used to store the polynomials for Galois Field Multiply operations (GFMPY). Control register CUCR1 is preferably used to store the Galois field polynomial generator function.

Vector datapath side B 116 includes P unit 246. P unit 246 performs basic logic operations on registers of local predicate register file 234. P unit 246 has direct access to read from and write to predication register file 234. These operations include single register unary operations such as: NEG (negate) which inverts each bit of the single register; BITCNT (bit count) which returns a count of the number of bits in the single register having a predetermined digital state (1 or 0); RMBD (right most bit detect) which returns a number of bit positions from the least significant bit position (right most) to a first bit position having a predetermined digital state (1 or 0); DECIMATE which selects every instruction specified Nth (1, 2, 4, etc.) bit to output; and EXPAND which replicates each bit an instruction specified N times (2, 4, etc.). These operations include two register binary operations such as: AND a bitwise AND of data of the two registers; NAND a bitwise AND and negate of data of the two registers; OR a bitwise OR of data of the two registers; NOR a bitwise OR and negate of data of the two registers; and XOR exclusive OR of data of the two registers. These operations include transfer of data from a predicate register of predicate register file 234 to another specified predicate register or to a specified data register in global vector register file 231. A commonly expected use of P unit 246 includes manipulation of the SIMD vector comparison results for use in control of a further SIMD vector operation. The BITCNT instruction may be used to count the number of 1's in a predicate register to determine the number of valid data elements from a predicate register.

Figure 3:
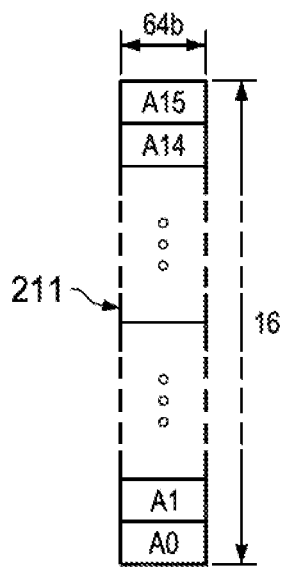
FIG. 3 shows an exemplary global scalar register file.

FIG. 3 illustrates global scalar register file 211. There are 16 independent 64-bit wide scalar registers designated A0 to A15. Each register of global scalar register file 211 can be read from or written to as 64-bits of scalar data. All scalar datapath side A 115 functional units (L1 unit 221, S1 unit 222, M1 unit 223, N1 unit 224, D1 unit 225 and D2 unit 226) can read or write to global scalar register file 211. Global scalar register file 211 may be read as 32-bits or as 64-bits and may only be written to as 64-bits. The instruction executing determines the read data size. Vector datapath side B 116 functional units (L2 unit 241, S2 unit 242, M2 unit 243, N2 unit 244, C unit 245 and P unit 246) can read from global scalar register file 211 via crosspath 117 under restrictions that will be detailed below.

Figure 4:
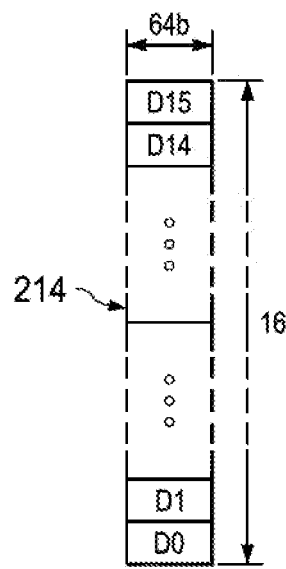
FIG. 4 shows an exemplary local scalar register file shared by arithmetic functional units.

FIG. 4 illustrates D1/D2 local register file 214. There are 16 independent 64-bit wide scalar registers designated D0 to D16. Each register of D1/D2 local register file 214 can be read from or written to as 64-bits of scalar data. All scalar datapath side A 115 functional units (L1 unit 221, S1 unit 222, M1 unit 223, N1 unit 224, D1 unit 225 and D2 unit 226) can write to global scalar register file 211. Only D1 unit 225 and D2 unit 226 can read from D1/D2 local scalar register file 214. It is expected that data stored in D1/D2 local scalar register file 214 will include base addresses and offset addresses used in address calculation.

Figure 5:
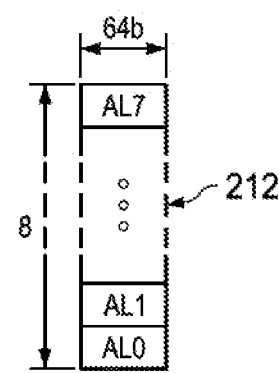
FIG. 5 shows an exemplary local scalar register file shared by multiply functional units.

FIG. 5 illustrates L1/S1 local register file 212. The example illustrated in FIG. 5 has 8 independent 64-bit wide scalar registers designated AL0 to AL7. The preferred instruction coding (see FIG. 15) permits L1/S1 local register file 212 to include up to 16 registers. The example of FIG. 5 implements only 8 registers to reduce circuit size and complexity. Each register of L1/S1 local register file 212 can be read from or written to as 64-bits of scalar data. All scalar datapath side A 115 functional units (L1 unit 221, S1 unit 222, M1 unit 223, N1 unit 224, D1 unit 225 and D2 unit 226) can write to L1/S1 local scalar register file 212. Only L1 unit 221 and S1 unit 222 can read from L1/S1 local scalar register file 212.

Figure 6:
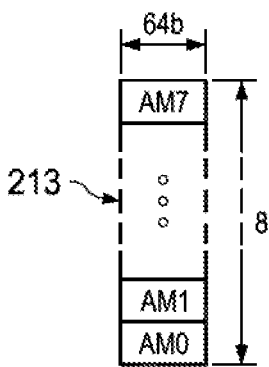
FIG. 6 shows an exemplary local scalar register file shared by load/store units.

FIG. 6 illustrates M1/N1 local register file 213. The example illustrated in FIG. 6 has 8 independent 64-bit wide scalar registers designated AM0 to AM7. The preferred instruction coding (see FIG. 15) permits M1/N1 local register file 213 to include up to 16 registers. The example of FIG. 6 implements only 8 registers to reduce circuit size and complexity. Each register of M1/N1 local register file 213 can be read from or written to as 64-bits of scalar data. All scalar datapath side A 115 functional units (L1 unit 221, S1 unit 222, M1 unit 223, N1 unit 224, D1 unit 225 and D2 unit 226) can write to M1/N1 local scalar register file 213. Only M1 unit 223 and N1 unit 224 can read from M1/N1 local scalar register file 213.

Figure 7:
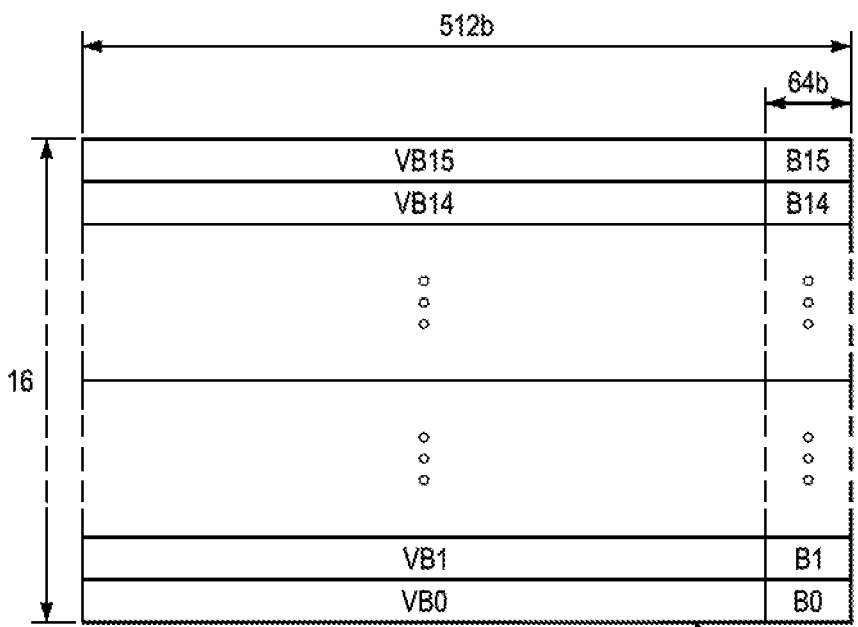
FIG. 7 shows an exemplary global vector register file.

FIG. 7 illustrates global vector register file 231. There are 16 independent 512-bit wide vector registers. Each register of global vector register file 231 can be read from or written to as 64-bits of scalar data designated B0 to B15. Each register of global vector register file 231 can be read from or written to as 512-bits of vector data designated VB0 to VB15. The instruction type determines the data size. All vector datapath side B 116 functional units (L2 unit 241, S2 unit 242, M2 unit 243, N2 unit 244, C unit 245 and P unit 246) can read or write to global scalar register file 231. Scalar datapath side A 115 functional units (L1 unit 221, S1 unit 222, M1 unit 223, N1 unit 224, D1 unit 225 and D2 unit 226) can read from global vector register file 231 via crosspath 117 under restrictions that will be detailed below.

Figure 8:
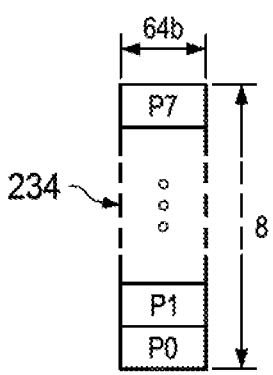
FIG. 8 shows an exemplary predicate register file.

FIG. 8 illustrates P local register file 234. There are 8 independent 64-bit wide registers designated P0 to P7. Each register of P local register file 234 can be read from or written to as 64-bits of scalar data. Vector datapath side B 116 functional units L2 unit 241, S2 unit 242, C unit 244 and P unit 246 can write to P local register file 234. Only L2 unit 241, S2 unit 242 and P unit 246 can read from P local scalar register file 234. A commonly expected use of P local register file 234 includes: writing one bit SIMD vector comparison results from L2 unit 241, S2 unit 242 or C unit 244; manipulation of the SIMD vector comparison results by P unit 246; and use of the manipulated results in control of a further SIMD vector operation.

Figure 9:
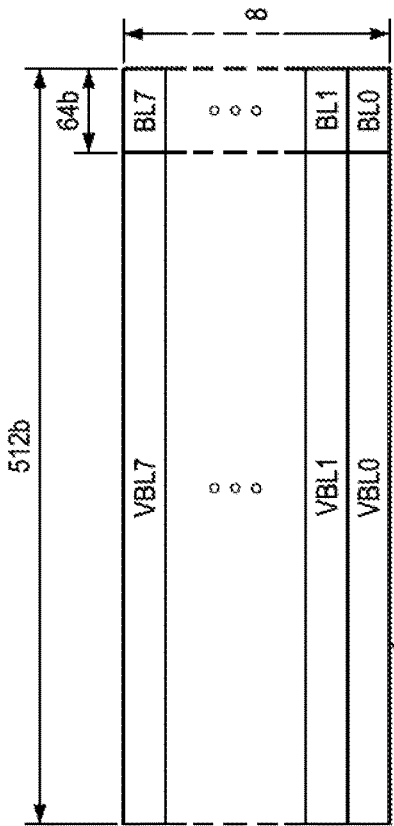
FIG. 9 shows an exemplary local vector register file shared by arithmetic functional units.

FIG. 9 illustrates L2/S2 local register file 232. The example illustrated in FIG. 9 has 8 independent 512-bit wide vector registers. The preferred instruction coding (see FIG. 15) permits L2/S2 local register file 232 to include up to 16 registers. The example of FIG. 9 implements only 8 registers to reduce circuit size and complexity. Each register of L2/S2 local vector register file 232 can be read from or written to as 64-bits of scalar data designated BL0 to BL7. Each register of L2/S2 local vector register file 232 can be read from or written to as 512-bits of vector data designated VBL0 to VBL7. The instruction type determines the data size. All vector datapath side B 116 functional units (L2 unit 241, S2 unit 242, M2 unit 243, N2 unit 244, C unit 245 and P unit 246) can write to L2/S2 local vector register file 232. Only L2 unit 241 and S2 unit 242 can read from L2/S2 local vector register file 232.

Figure 10:
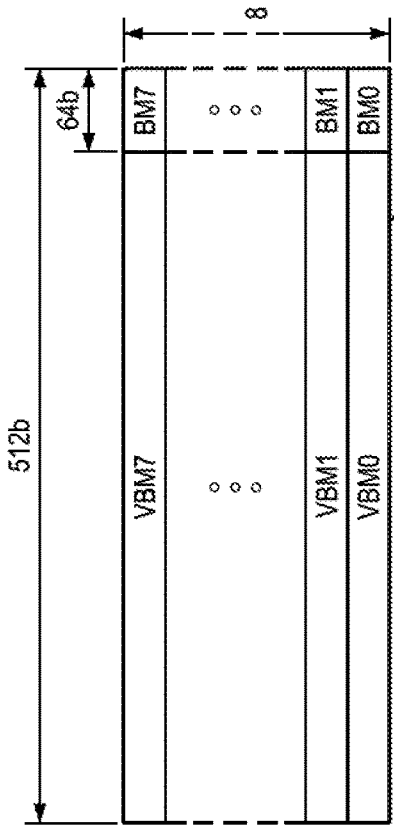
FIG. 10 shows an exemplary local vector register file shared by multiply and correlation functional units.

FIG. 10 illustrates M2/N2/C local register file 233. The example illustrated in FIG. 10 has 8 independent 512-bit wide vector registers. The preferred instruction coding (see FIG. 15) permits M2/N2/C local vector register file 233 include up to 16 registers. The example of FIG. 10 implements only 8 registers to reduce circuit size and complexity. Each register of M2/N2/C local vector register file 233 can be read from or written to as 64-bits of scalar data designated BM0 to BM7. Each register of M2/N2/C local vector register file 233 can be read from or written to as 512-bits of vector data designated VBM0 to VBM7. All vector datapath side B 116 functional units (L2 unit 241, S2 unit 242, M2 unit 243, N2 unit 244, C unit 245 and P unit 246) can write to M2/N2/C local vector register file 233. Only M2 unit 243, N2 unit 244 and C unit 245 can read from M2/N2/C local vector register file 233.

The provision of global register files accessible by all functional units of a side and local register files accessible by only some of the functional units of a side is a design choice. Some examples of this disclosure employ only one type of register file corresponding to the disclosed global register files.

Referring back to FIG. 2, crosspath 117 permits limited exchange of data between scalar datapath side A 115 and vector datapath side B 116. During each operational cycle one 64-bit data word can be recalled from global scalar register file A 211 for use as an operand by one or more functional units of vector datapath side B 116 and one 64-bit data word can be recalled from global vector register file 231 for use as an operand by one or more functional units of scalar datapath side A 115. Any scalar datapath side A 115 functional unit (L1 unit 221, S1 unit 222, M1 unit 223, N1 unit 224, D1 unit 225 and D2 unit 226) may read a 64-bit operand from global vector register file 231. This 64-bit operand is the least significant bits of the 512-bit data in the accessed register of global vector register file 231. Plural scalar datapath side A 115 functional units may employ the same 64-bit crosspath data as an operand during the same operational cycle. However, only one 64-bit operand is transferred from vector datapath side B 116 to scalar datapath side A 115 in any single operational cycle. Any vector datapath side B 116 functional unit (L2 unit 241, S2 unit 242, M2 unit 243, N2 unit 244, C unit 245 and P unit 246) may read a 64-bit operand from global scalar register file 211. If the corresponding instruction is a scalar instruction, the crosspath operand data is treated as any other 64-bit operand. If the corresponding instruction is a vector instruction, the upper 448 bits of the operand are zero filled. Plural vector datapath side B 116 functional units may employ the same 64-bit crosspath data as an operand during the same operational cycle. Only one 64-bit operand is transferred from scalar datapath side A 115 to vector datapath side B 116 in any single operational cycle.

Streaming engine 125 transfers data in certain restricted circumstances. Streaming engine 125 controls two data streams. A stream consists of a sequence of elements of a particular type. Programs that operate on streams read the data sequentially, operating on each element in turn. Every stream has the following basic properties. The stream data have a well-defined beginning and ending in time. The stream data have fixed element size and type throughout the stream. The stream data have a fixed sequence of elements. Thus, programs cannot seek randomly within the stream. The stream data is read-only while active. Programs cannot write to a stream while simultaneously reading from it. Once a stream is opened, the streaming engine 125: calculates the address; fetches the defined data type from level two unified cache (which may require cache service from a higher level memory); performs data type manipulation such as zero extension, sign extension, data element sorting/swapping such as matrix transposition; and delivers the data directly to the programmed data register file within CPU 110. Streaming engine 125 is thus useful for real-time digital filtering operations on well-behaved data. Streaming engine 125 frees these memory fetch tasks from the corresponding CPU enabling other processing functions.

Streaming engine 125 provides the following benefits. Streaming engine 125 permits multi-dimensional memory accesses. Streaming engine 125 increases the available bandwidth to the functional units. Streaming engine 125 minimizes the number of cache miss stalls since the stream buffer bypasses level one data cache 123. Streaming engine 125 reduces the number of scalar operations required to maintain a loop. Streaming engine 125 manages address pointers. Streaming engine 125 handles address generation automatically freeing up the address generation instruction slots and D1 unit 225 and D2 unit 226 for other computations.

CPU 110 operates on an instruction pipeline. Instructions are fetched in instruction packets of fixed length further described below. All instructions require the same number of pipeline phases for fetch and decode, but require a varying number of execute phases.

Figure 11:
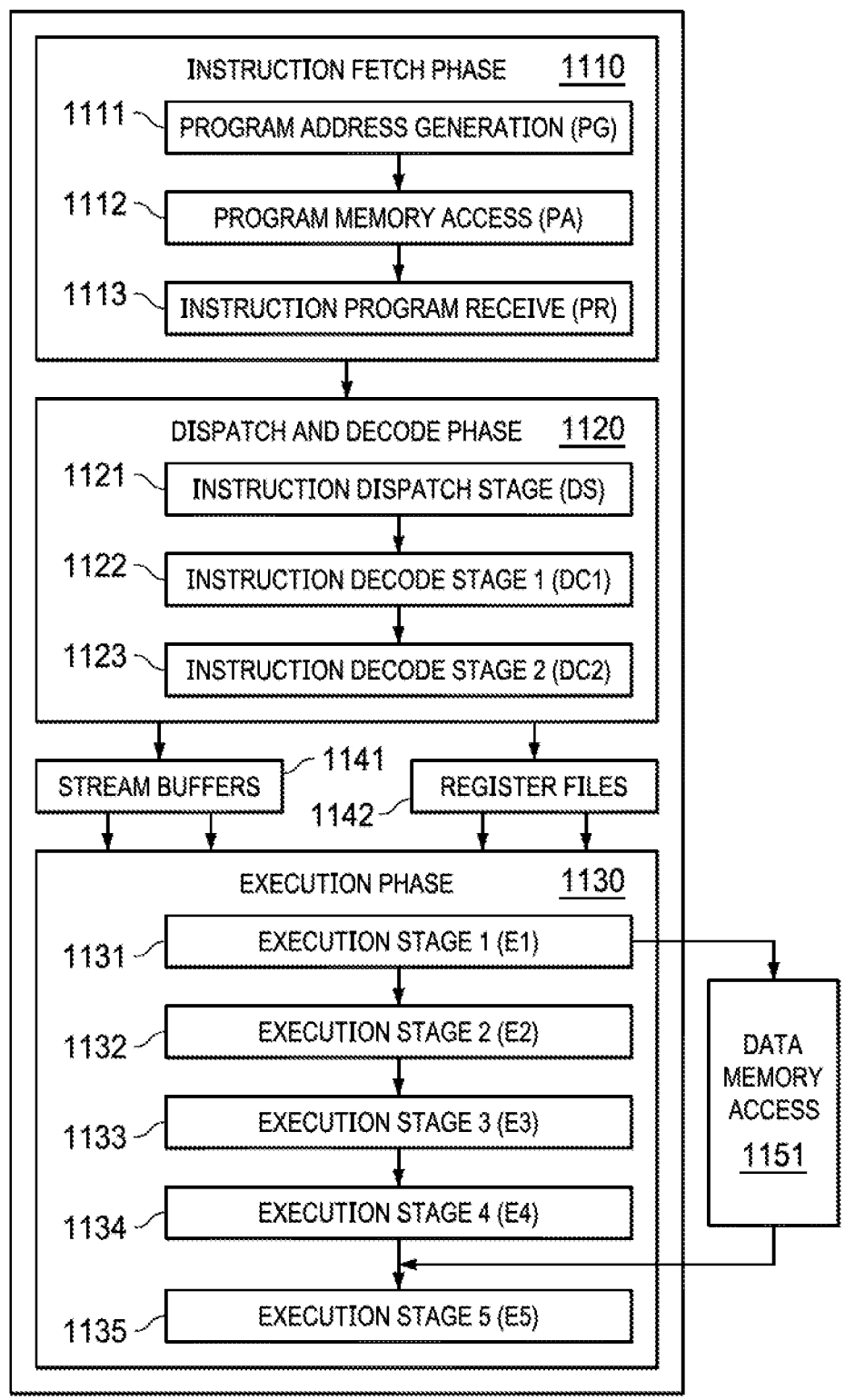
FIG. 11 shows pipeline phases of the central processing unit in accordance with various examples.

FIG. 11 illustrates the following pipeline phases: program fetch phase 1110, dispatch and decode phases 1120 and execution phases 1130. Program fetch phase 1110 includes three stages for all instructions. Dispatch and decode phases 1120 include three stages for all instructions. Execution phase 1130 includes one to four stages dependent on the instruction.

Fetch phase 1110 includes program address generation stage 1111 (PG), program access stage 1112 (PA) and program receive stage 1113 (PR). During program address generation stage 1111 (PG), the program address is generated in the CPU and the read request is sent to the memory controller for the level one instruction cache L1I. During the program access stage 1112 (PA) the level one instruction cache L1I processes the request, accesses the data in its memory and sends a fetch packet to the CPU boundary. During the program receive stage 1113 (PR) the CPU registers the fetch packet.

Figure 12:
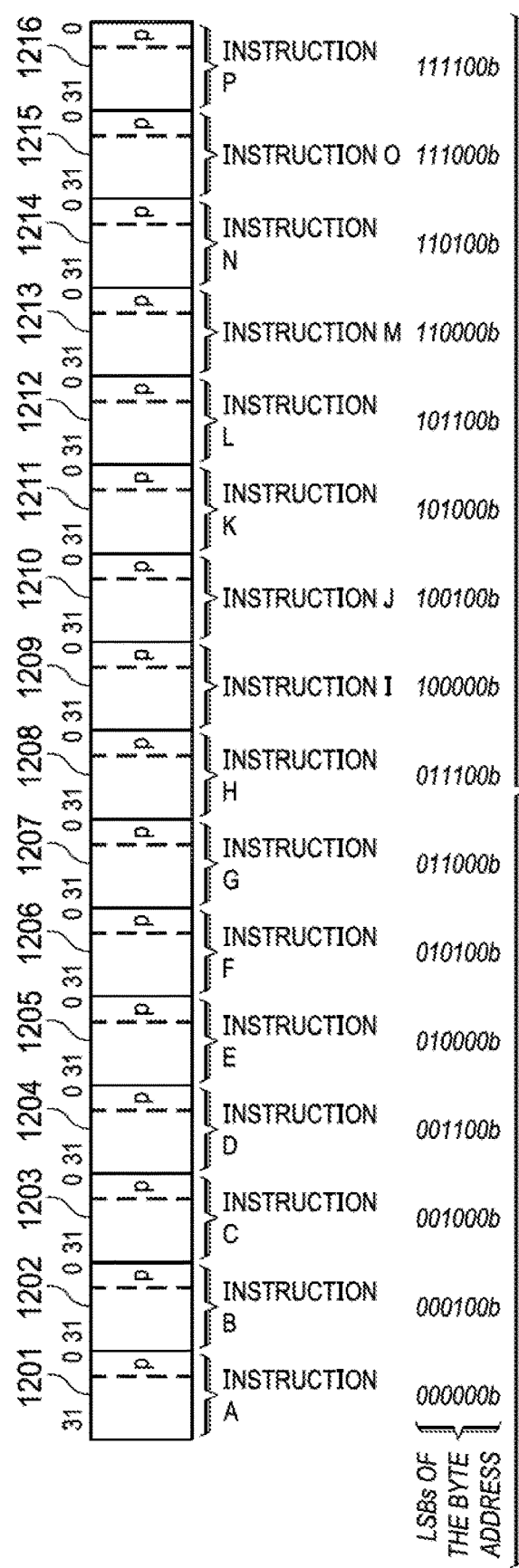
FIG. 12 shows sixteen instructions of a single fetch packet in accordance with various examples.

Instructions are always fetched sixteen 32-bit wide slots, constituting a fetch packet, at a time. FIG. 12 illustrates 16 instructions 1201 to 1216 of a single fetch packet. Fetch packets are aligned on 512-bit (16-word) boundaries. An example employs a fixed 32-bit instruction length. Fixed length instructions are advantageous for several reasons. Fixed length instructions enable easy decoder alignment. A properly aligned instruction fetch can load plural instructions into parallel instruction decoders. Such a properly aligned instruction fetch can be achieved by predetermined instruction alignment when stored in memory (fetch packets aligned on 512-bit boundaries) coupled with a fixed instruction packet fetch. An aligned instruction fetch permits operation of parallel decoders on instruction-sized fetched bits. Variable length instructions require an initial step of locating each instruction boundary before they can be decoded. A fixed length instruction set generally permits more regular layout of instruction fields. This simplifies the construction of each decoder which is an advantage for a wide issue VLIW central processor.

The execution of the individual instructions is partially controlled by a p bit in each instruction. This p bit is preferably bit 0 of the 32-bit wide slot. The p bit determines whether an instruction executes in parallel with a next instruction. Instructions are scanned from lower to higher address. If the p bit of an instruction is 1, then the next following instruction (higher memory address) is executed in parallel with (in the same cycle as) that instruction. If the p bit of an instruction is 0, then the next following instruction is executed in the cycle after the instruction.

CPU 110 and level one instruction cache L1I 121 pipelines are de-coupled from each other. Fetch packet returns from level one instruction cache L1I can take different number of clock cycles, depending on external circumstances such as whether there is a hit in level one instruction cache 121 or a hit in level two combined cache 130. Therefore program access stage 1112 (PA) can take several clock cycles instead of 1 clock cycle as in the other stages.

The instructions executing in parallel constitute an execute packet. In an example, an execute packet can contain up to sixteen instructions. No two instructions in an execute packet may use the same functional unit. A slot is one of five types: 1) a self-contained instruction executed on one of the functional units of CPU 110 (L1 unit 221, S1 unit 222, M1 unit 223, N1 unit 224, D1 unit 225, D2 unit 226, L2 unit 241, S2 unit 242, M2 unit 243, N2 unit 244, C unit 245 and P unit 246); 2) a unitless instruction such as a NOP (no operation) instruction or multiple NOP instruction; 3) a branch instruction; 4) a constant field extension; and 5) a conditional code extension. Some of these slot types will be further explained below.

Dispatch and decode phases 1120 include instruction dispatch to appropriate execution unit stage 1121 (DS), instruction pre-decode stage 1122 (DC1); and instruction decode, operand reads stage 1123 (DC2). During instruction dispatch to appropriate execution unit stage 1121 (DS), the fetch packets are split into execute packets and assigned to the appropriate functional units. During the instruction pre-decode stage 1122 (DC1), the source registers, destination registers and associated paths are decoded for the execution of the instructions in the functional units. During the instruction decode, operand reads stage 1123 (DC2), more detailed unit decodes are done, as well as reading operands from the register files.

Execution phases 1130 includes execution stages 1131 to 1135 (E1 to E5). Different types of instructions require different numbers of these stages to complete their execution. These stages of the pipeline play an important role in understanding the device state at CPU cycle boundaries.

During execute 1 stage 1131 (E1) the conditions for the instructions are evaluated and operands are operated on. As illustrated in FIG. 11, execute 1 stage 1131 may receive operands from a stream buffer 1141 and one of the register files shown schematically as 1142. For load and store instructions, address generation is performed and address modifications are written to a register file. For branch instructions, branch fetch packet in PG phase is affected. As illustrated in FIG. 11, load and store instructions access memory here shown schematically as memory 1151. For single-cycle instructions, results are written to a destination register file. This assumes that any conditions for the instructions are evaluated as true. If a condition is evaluated as false, the instruction does not write any results or have any pipeline operation after execute 1 stage 1131.

During execute 2 stage 1132 (E2) load instructions send the address to memory. Store instructions send the address and data to memory. Single-cycle instructions that saturate results set the SAT bit in the control status register (CSR) if saturation occurs. For 2-cycle instructions, results are written to a destination register file.

During execute 3 stage 1133 (E3) data memory accesses are performed. Any multiply instructions that saturate results set the SAT bit in the control status register (CSR) if saturation occurs. For 3-cycle instructions, results are written to a destination register file.

During execute 4 stage 1134 (E4) load instructions bring data to the CPU boundary. For 4-cycle instructions, results are written to a destination register file.

During execute 5 stage 1135 (E5) load instructions write data into a register. This is illustrated schematically in FIG. 11 with input from memory 1151 to execute 5 stage 1135.

In some cases, the processor 100 (e.g., a DSP) may be called upon to execute software that includes nested loops. Software pipelining involves initiating new iterations of the loop before previous iterations have completed to obtain high throughput. This implies there are some cycles (loop prolog) to begin executing, or pipe up, of each inner loop and some more cycles to pipe down the loop (loop epilog). These cycles will be incurred for each outer loop execution so they can affect performance, especially when the inner loop count is small. The more deeply pipelined the DSP 100 is, the more cycles will be required for the prolog and epilog. As explained above, particularly with respect to imperfectly nested loops, executing nested loops in a pipelined fashion introduces difficulties in determining whether to execute an instruction associated with the one or more outer loops, for example determining a predicate for the instruction in an efficient manner.

In the following description, reference is made to an exemplary nested loop as follows, with the function of each line of pseudo-code explained as a comment:

```
for (int i = 0; i < N; i++) {          // outer loop of N iterations
    B0 = 0;                            // initialize register B0 to a value of 0
    for (int j = 0; j < M; j++) {      // inner loop of M iterations
        B0 += D0[i*M + j];             // B0 as a running sum of elements of array D0
    }
    D1[i] = B0;                        // store each M-element sum as element of array D1
}
```

Example 1. Uncoalesced Nested Loop

For terminological consistency, the above nested loop has an "inner loop count" value of M and an "outer loop count" value of N.

This exemplary nested loop can be rewritten or "coalesced" as a single loop by conditioning or predicating the instructions associated with the outer loop. An example of the resulting coalesced nested loop is given as follows:

```
for (int k = 0; k < N*M; k++) {
    if (k % M == 0) B0 = 0;                   //only executed when k-count corresponds to an outer
                                              //loop iteration
    B0 += D0[k];
    if ((k+1) % M == 0) D1[k/M] = B0;         //same as above
}
```

Example 2a. Coalesced Nested Loop

The foregoing is one example of loop coalescing. Other examples may avoid the more computationally-intensive division and modulus operations by implementing record-keeping variables and utilizing pointer arithmetic. For example:

```
Inner_count = 0;
for (int k = 0; k < N*M; k++) {
    if (Inner_count == M) {
        Inner_count = 0;    // reset inner count if M inner loop iterations performed
        B0 = 0;             // reset accumulator upon re-entry of original inner loop
    }
    B0 += *D0++             //equivalent to B0 += D0[k];
    if (++Inner_count == M) *D1++ = B0;
}
```

Example 2b. Coalesced Nested Loop

In some examples, one or more outer loops may be empty, or not contain any instructions other than the loop control instruction itself. Such an outer loop can be combined or collapsed to the next (inside) outer loop by adjusting the variables in the loop control instruction. For example:

```
for (int i = 0; i < N; i++) {
    for (int j = 0; j < M; j++) {
        B0 += D0[i*j];
    }
}
This may be collapsed to be:
for (int k = 0; k < N*M; k++) {
    B0 += D0[k];
}
```

Example 3. Collapsed Nested Loop

Once any such empty outer loops have been collapsed, the resultant imperfectly nested loop is coalesced as explained above.

As will be explained in further detail below, a coalesced nested loop is more suited to take advantage of pipelined execution of software by the DSP 100. However, since the outer loop instructions are conditioned (e.g., only carried out in the pseudo-code above as a result of an if statement being true), the corresponding outer loop instructions in the pipeline must be predicated, which requires that a predicate be determined for each instruction to decide whether to execute the outer loop instruction in a particular cycle. Typically, the computation and storage of predicate values is complex and monopolizes a large number of registers (e.g., to hold predicate values for many different instructions). Examples of this disclosure directed to the nested loop controller, explained further below, improve upon these shortcomings.

Figure 13A:
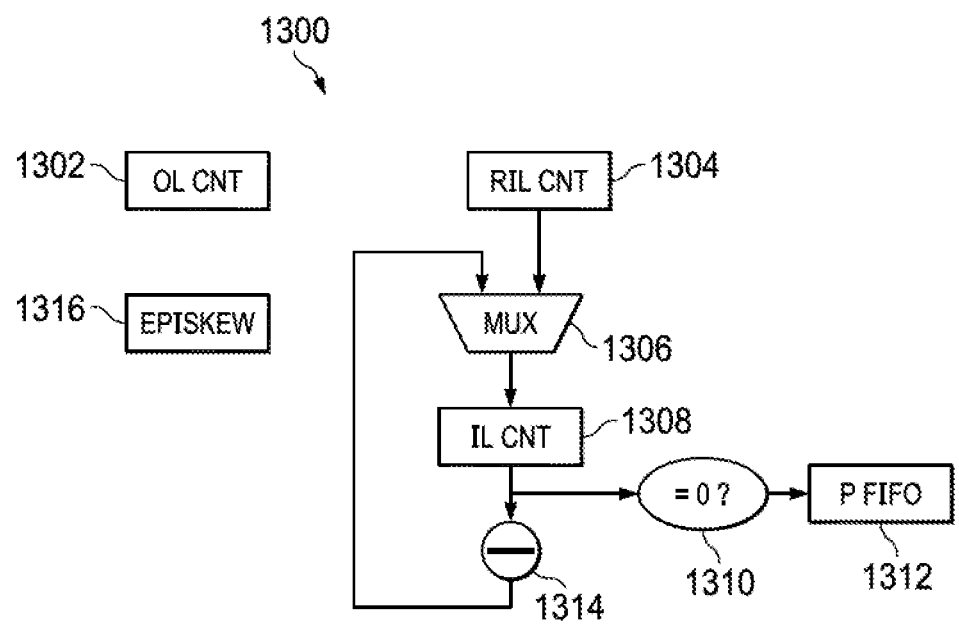
FIGS. 13A and 13B show schematic diagrams of nested loop controllers in accordance with various examples.

Turning now to FIG. 13A, a nested loop controller 1300 is shown in accordance with examples of this disclosure. The nested loop controller 1300 is shown employing hardware and logic constructs, which are exemplary. It should be appreciated that the nested loop controller 1300 may be designed using different, substitute hardware and logic constructs. The nested loop controller 1300 includes an outer loop counter 1302 (having an OLCNT value), an inner loop counter 1308 (having an ILCNT value), and a predicate FIFO 1312. Each of the counters 1302, 1308 and the predicate FIFO 1312 may be implemented as, for example, a register, such as control registers 114 explained above. In certain examples, the nested loop controller 1300 also includes an episkew counter 1316 (having an EPISKEW value), which may also be implemented as a control register 114 and will be explained in further detail below.

Examples of this disclosure also include instructions to interact with a nested loop controller 1300. A nested loop controller 1300 initialization instruction (NLCINIT) initializes the outer loop counter 1302 and the inner loop counter 1308 (and/or an inner loop reload register 1304) values. For the sake of consistency, it is assumed that NLCINIT initializes the outer loop counter 1302 to the outer loop count value minus 1 and initializes the inner loop counter (and/or the inner loop reload register 1304, depending on implementation) to the inner loop count value minus 1. In this particular example, the nested loop controller 1300 functions by decrementing counter values, and thus a threshold (e.g., for purposes of resetting) for the counter values is zero.

However, it should be appreciated that, more generally, the outer loop, inner loop, and episkew counters 1302, 1308, 1316 are advanced, and could, for example, be initialized to a value of zero and subsequently incremented to a threshold (e.g., the loop count value minus 1). This disclosure is not restricted to any particular method of counter management, and all such approaches are within the scope of the examples described herein. A compiler generates an NLCINIT instruction to be executed prior to the instructions of the nested loop.

A nested loop controller 1300 advance instruction (TICK) advances the outer loop, inner loop, and episkew counters 1302, 1308, 1316 of the nested loop controller 1300 according to certain logic, which will be explained in further detail below. The TICK instruction is a unitless instruction. As will also be explained, a compiler generates a TICK instruction for each iteration of a coalesced nested loop.

A nested loop controller 1300 get predicate instruction (GETP) reads a value from the predicate FIFO 1312 (e.g., a single bit) and writes the value into a destination register of the DSP 100. In addition to specifying the destination register, a GETP instruction also includes an offset value that specifies a location in the predicate FIFO 1312 to be written into the destination register. As will be explained in further detail below, this allows for a simple approach to accessing the predicate value associated with a historical TICK instruction. As will be explained further below, the compiler generates a GETP instruction for any predicated instructions (i.e., outer loop instructions prior to coalescing a nested loop), which are then executed depending on the value returned by the GETP instruction.

The nested loop controller 1300 functionality will be explained further with reference to FIGS. 13A and 13B and FIGS. 14A-1, 14A-2, 14B, and 14C. For simplicity, reference is made to the above nested loop Examples 1 and 2, with an outer loop count value (N) of 5, and an inner loop count value (M) of 3. Further, it is assumed that all instructions are completed in one cycle, except a load instruction, which is completed in three cycles. As explained above, the compiler initially generates an NLCINIT instruction that, when executed, initializes the outer loop and inner loop counters 1302, 1308. In this example, in which counters are advanced by being decremented, the outer loop counter 1302 is initialized to the outer loop count value minus 1, or 4, and the inner loop counter 1308 is initialized to the inner loop count value minus 1, or 2. The inner loop reload register 1304 is also initialized to 2 and does not change in this example.

A multiplexor (mux) 1306 determines whether to load the inner loop counter 1308 with the value held in the inner loop reload register 1304 (e.g., either as initialization or upon a reset of the inner loop counter 1308 at the end of an inner loop iteration). A comparator 1310 compares the value held in the inner loop counter 1308 to 0 and populates the predicate FIFO 1312 accordingly. In this logical example, when the inner loop counter 1308 is equal to 0, a value of 1 is pushed into the predicate FIFO 1312, which is an outer loop indicator. When the inner loop counter 1308 is not equal to zero, a value of 0 is pushed into the predicate FIFO 1312, which is an inner loop indicator. The distinction and importance of these predicate FIFO 1312 values is explained further below. A subtraction circuit 1314 decrements the inner loop counter 1308 (in response to execution of a TICK instruction) and updates the inner loop counter 1308 through the mux 1306.

When the inner loop counter 1308 reaches a threshold (0 in this example) and the outer loop counter 1304 has not yet reached a threshold (again, 0 in this example), the inner loop counter 1308 is reset by the mux 1306 and the inner loop reload register 1304, while the outer loop counter 1302 is decremented. Once the outer loop counter 1302 reaches its threshold, the inner loop counter 1308 ceases to be reset. Further, although not demonstrated in the logic of FIGS. 13A and 13B, the outer loop counter 1302 reaching its threshold also prevents the comparator 1310 from pushing outer loop indicators (i.e., 1 s in this example) into the predicate FIFO 1312 even though the inner loop counter 1308 is equal to 0. Finally, the episkew counter 1316 is utilized in cases where the one or more stages of the epilog are collapsed.

Figure 13B:
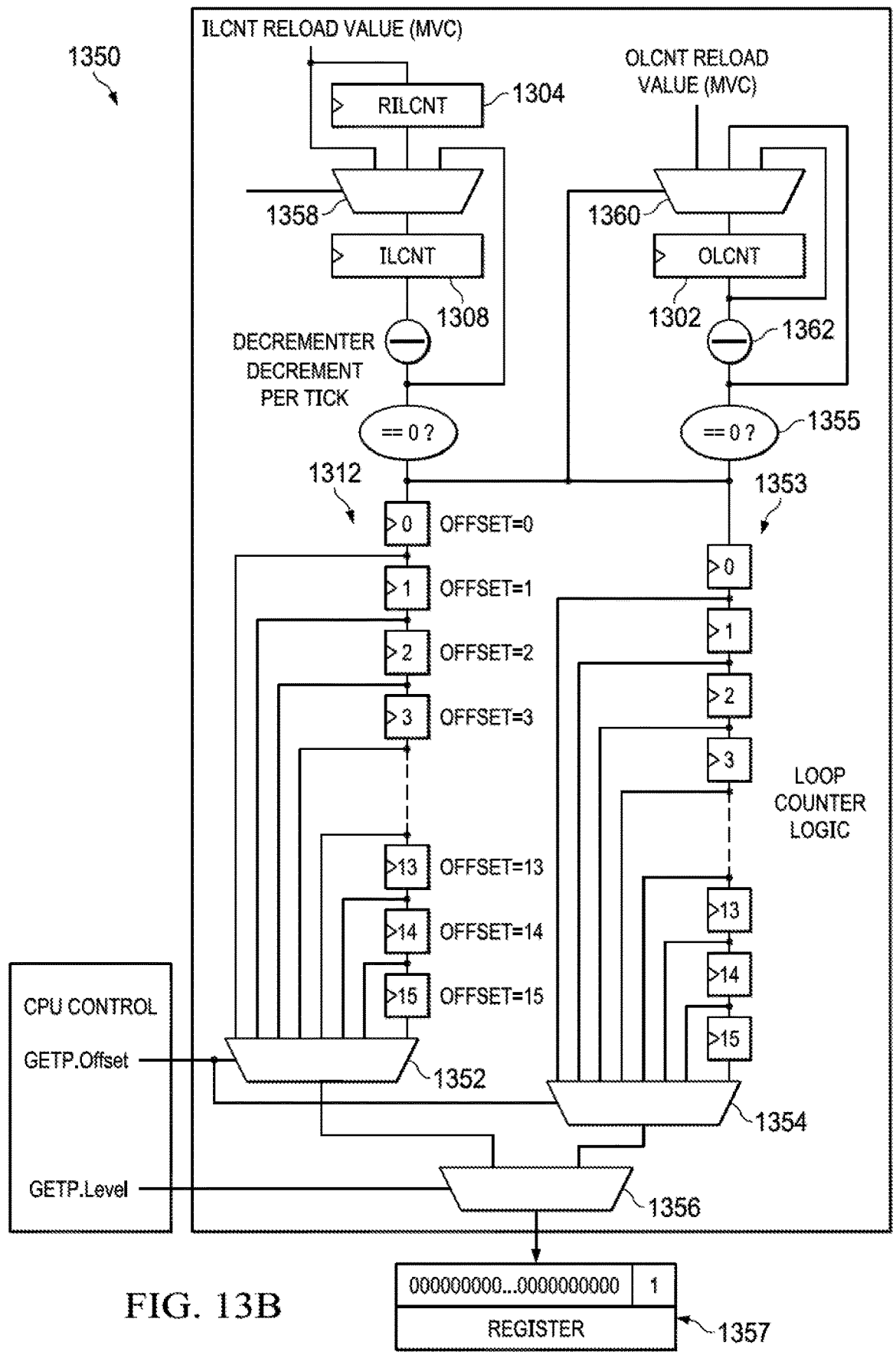

FIG. 13B shows another example of a nested loop controller 1350 in accordance with examples of this disclosure. The nested loop controller 1350 is similar to the nested loop controller 1300 of FIG. 13A, but with additional detail shown. For example, the nested loop controller 1350 also includes the outer loop counter 1302 and the inner loop counter 1308 (and/or an inner loop reload register 1304). The predicate FIFO 1312 is also shown in further detail; which demonstrates one example of how indexing into the predicate FIFO 1312 is achieved in response to a GETP instruction. In particular, an offset value of a GETP instruction controls a mux 1352 to output the desired value of offset into the predicate FIFO 1312. For example, a GETP instruction having an offset value of 0 and a level value of 0 controls the mux 1352 to select the bit of the predicate FIFO 1312 corresponding to an offset of 0, shown as Offset=0. As another example, a GETP instruction having an offset value of 3 and a level value of 0 controls the mux 1352 to select the bit of the predicate FIFO 1312 corresponding to an offset of 3, shown as Offset=3.

The nested loop controller 1350 includes an additional predicate FIFO 1353, which is populated based on whether the outer loop counter 1302 is equal to zero (e.g., based on a comparator 1355). In this example, the outer loop counter 1302 is alternately referred to as a middle loop counter 1302. A separate outer loop counter, which is not shown for simplicity, is implemented to indicate when the nested loop controller 1350 is to cease executing the coalesced loop (e.g., when the inner, middle, and outer loop counters reach 0 in the example where counters are advanced by being decremented). In particular, having two predicate FIFOs 1312, 1353 as shown allows coalescing nested loops that include inner, middle, and outer loops that all contain instructions to be executed. In this example, the predicate FIFO 1312 provides predicates for conditional execution of instructions in the middle loop, while the predicate FIFO 1353 provides predicates for conditional execution of instructions in the outer loop. The predicate FIFO 1353 is also indexed into using a GETP instruction offset value as a control signal to a mux 1354. In addition, a GETP instruction level value is provided as a control signal to a mux 1356 to select whether a particular offset predicate value is provided by the predicate FIFO 1312 populated based on the inner loop counter 1308 or the predicate FIFO 1353 populated based on the middle loop counter 1302. Regardless of whether a predicate value is provided by the predicate FIFO 1312 populated based on the inner loop counter 1308 or the predicate FIFO 1353 populated based on the middle loop counter 1302, the predicate value is provided to a register 1357 specified by a GETP instruction, the value of which register may then be used to determine whether to execute a predicated instruction.

Additionally, the nested loop controller 1350 demonstrates different ways in which the inner loop counter 1308 and the outer loop counter 1302 may be populated. For example, based on control of a mux 1358, the inner loop counter 1308 is either populated with a decremented value from the subtraction circuit 1314 (e.g. when the inner loop counter 1308 and the outer loop counter 1302 are non-zero) or with an inner loop reload register 1304 value (e.g., when the inner loop counter 1308 reaches zero and the outer loop counter 1302 is non-zero). The inner loop counter 1308 may also be initially populated with a value corresponding to a move constant (MVC) instruction, which is also used to initialize the inner loop reload register 1304.

In another example, based on control of a mux 1360, the outer loop counter 1302 is either populated with a decremented value from a subtraction circuit 1362 (e.g. when the inner loop counter 1308 reaches zero and the outer loop counter 1302 is non-zero) or with the current value in the outer loop counter 1302 (e.g. when the inner loop counter 1308 and the outer loop counter 1302 are non-zero). The outer loop counter 1302 may also be initially populated with a value corresponding to a move constant (MVC) instruction.

As above, the nested loop controller 1350 is initialized with an NLCINIT instruction that initializes both the inner loop counter 1308 and the outer loop counter 1302 registers, as well as provides an episkew parameter that indicates the number of additional branches taken once the inner loop counter 1308 and the outer loop counter 1302 reach zero.

Also, as above, the nested loop controller 1350 is advanced in response to a TICK instruction, which advances the inner loop counter 1308 and the outer loop counter and updates the predicate FIFOs 1312, 1353. In one example, the counters 1308, 1302 are advanced "odometer style," in which the inner loop counter 1308 reaching its trip count (e.g., zero) causes the outer loop counter 1302 to advance (e.g., decrement). In some examples, it is assumed that a TICK instruction is the first instruction in a software pipelined loop.

Further, as above, the nested loop controller 1350 predicate FIFOs 1312, 1353 are accessed in response to a GETP instruction. The GETP instruction provides a nested loop controller 1350 query that retrieves a predicate value for a specified level. In a given iteration of a loop, retrieving the predicate prior to a TICK instruction produces the preloop predicate (e.g., the predicate register value for the preloop instructions), while retrieving the predicate following a TICK instruction produces the postloop predicate (e.g., the predicate register value for the postloop instructions). In one example, a GETP issued after initialization (e.g., execution of an NLCINIT instruction) but prior to the first TICK returns "true" or an asserted predicate value. Such a GETP instruction corresponds to a preloop predicate, so this exemplary behavior enables preloop instructions to execute on the first loop iteration.

The GETP instruction also includes a level parameter that specifies the loop level (e.g., is a control signal for the mux 1356) as explained above. The GETP instruction offset value is used as a control signal to the muxes 1352, 1354 to index into the predicate FIFOs 1312, 1353, which facilitates overlapping lifetimes in a software pipeline. In one example, unlike a move constant (MVC) instruction, the GETP instruction can be executed on the .S1, .L1, and .M1 units, instead of only on the .S1 unit.

FIGS. 14A-1 and 14A-2 show an example of pseudo-assembly code instructions that result from compiling the coalesced nested loop in accordance with examples of this disclosure. In particular, FIGS. 14A-1 and 14A-2 show a coalesced loop that is not software pipelined, but that uses the nested loop controller 1300, 1350 described above. The loop of FIGS. 14A-1 and 14A-2 corresponds to the loops shown in Examples 1 and 2, above. The loop of FIGS. 14A-1 and 14A-2 contains an inner loop that sums part of a vector. An outer loop initializes an accumulator to zero before the inner loop. Upon completion of the inner loop, the outer loop stores the accumulation result to memory. Thus, when the nested loop is coalesced, the outer loop operations need to be predicated appropriately. A GETP instruction is used to generate a predicate for the accumulator initialization and another GETP instruction is used to generate a predicate for the store to memory of the accumulation result.

The vertical axis represents a cycle count and shows which instructions are executed each cycle. The horizontal axis "slots" represent the functional units that carry out a particular instruction, and thus depicts the instructions executing on particular functional units. In this example, a new iteration of the coalesced loop begins every 8 cycles.

FIGS. 14A-1 and 14A-2 also show the values of the predicate FIFO 1312 for each cycle, with the left-most bit being the input or "first" bit. As explained above, execution of a coalesced nested loop begins with a NLCINIT instruction, which is unitless. Further, in cycle 0, a TICK instruction is initially executed; however, it should be appreciated that this tick may be omitted by altering subsequent GETP instruction logic (e.g., to change the offset into the predicate FIFO 1312 by −1). Only one TICK instruction has occurred before the execution of the GETP instruction in cycle 1, which obtains the predicate for the initialization of the accumulator (the MVK (move constant) instruction in cycle 2), and thus the offset into the predicate FIFO 1312 for the GETP instruction is zero. The GETP instruction in cycle 1 obtains the first bit of the predicate FIFO 1312 for the outer loop. In some cases, the predicate FIFO 1312 is initialized to have an outer loop value (e.g., a 1) in its first input bit. In this case, because the loop has just begun and a TICK instruction was executed in the previous cycle, the first bit in the predicate FIFO 1312 is true (1), which is stored in register A5 and thus the MVK instruction will execute on this first time through the inner loop. In FIGS. 14A-1 and 14A-2, bolded font indicates when the obtained predicate is true and thus the outer loop instruction executes.

In cycle 2, since A5 contains a predicate value of true (1), the MVK (move constant) instruction is executed to load register B0 with a value of 0. However, in the second iteration starting on cycle 8, the MVK instruction does not execute because the TICK instruction in cycle 8 pushes a 0 into the predicate FIFO 1312, causing the GETP instruction in cycle 9 to return a false (0).

On the third iteration beginning in cycle 16, three inner loop iterations have executed and thus the outer loop code after the inner loop code (e.g., the store of the accumulation result) should execute. For this reason, the GETP instruction in cycle 22, which returns the predicate for the SDD (store double word) instruction that stores the accumulation result, has an offset of 2 so that the GETP instruction obtains the predicate from two iterations prior, which is when the outer loop predicate was true (1). In this example, the loop level parameter explained above is omitted for clarity since there is only one level of loop nesting in this example.

The example of FIGS. 14A-1 and 14A-2 continues with the second iteration of the outer loop, where the initialization of the accumulator (e.g., the MVK instruction) is executed since the TICK instruction in cycle 24 pushes a true (1) into the predicate FIFO 1312, causing the GETP in cycle 25 to return that value. The loop iterations continue in a similar fashion through cycles 26-55 as shown in the remainder of FIGS. 14A-1 and 14A-2.

FIG. 14B shows a coalesced nested loop that is software pipelined and uses the nested loop controller 1300, 1350 described above. In this example, as above, the inner loop count is 3 and the outer loop count is 5, resulting in a total of 15 original inner loop iterations. In this example, a new iteration of the coalesced loop begins every cycle. In cycle 0, the TICK instruction pushes a true (1) to the predicate FIFO 1312, while in cycle 1 the GETP instruction having an offset of 0 obtains the 1 off of the front of the predicate FIFO 1312 (e.g., during a first part of the cycle). The TICK instruction in cycle 1 causes the comparator 1310 of the nested loop controller 1300 to push a 0 to the predicate FIFO 1312 (e.g., during a second part of the cycle). In this example, the GETP instruction reads the predicate FIFO 1312 during a first part of the cycle, such that the 1 from the previous cycle is still at the front of the predicate FIFO 1312, and thus an offset of 0 is used for the GETP instruction.

In FIG. 14B, the instructions pipe-up as each successive iteration is started in the prolog of the software pipelined loop. As in FIGS. 14A-1 and 14A-2, bolded font indicates when an obtained predicate is true and the predicated, outer loop instruction executes. Once an execute packet contains all possible instructions for the coalesced nested loop, as begins in cycle 7, the loop is said to be in the kernel. The prolog refers to the cycles that precede and build to the kernel (e.g., cycles 0-6), while the epilog refers to the cycles that follow the kernel and wind down the loop (e.g., cycles 15-21). In cycle 7, the software pipelined coalesced loop enters the kernel stage, where the loop repeats the same sequence of instructions (in this example, only one cycle of instructions as the initiation interval is 1 cycle). In cycle 8, the third GETP instruction is executed. This GETP instruction obtains the predicate for the store of the accumulated value in register B0. Thus, the obtained predicate should be true. As can be seen, an offset of 7 for the GETP instruction obtains the outer loop predicate from the first iteration, when the outer loop predicate was true. The inner loop counter 1308 (ILC) is decremented on each cycle and reset to 2 when 3 iterations are completed. At the end of each 3 iterations, the outer loop counter 1302 (OLC) is decremented. In this case, when the OLC and ILC reach zero, the branch in the kernel is not taken, so control falls into the epilog. The epilog code then pipes-down the loop, ending with a GETP instruction and store of the final accumulated value.

FIG. 14C shows a coalesced nested loop that uses the nested loop controller 1300, 1350 described above, and that has been software pipelined, with full epilog collapsing performed. FIG. 14C is similar to FIG. 14B, except that the kernel is executed extra times to account for the fact that the epilog has been removed by stage collapsing. In this example, the compiler uses an NLCINIT episkew value of 7 to indicate to the nested loop controller 1300, 1350 to execute the kernel (e.g., through the use of additional BNL instructions, which are explained further below) an additional 7 times. In some examples, the compiler determines that the over-execution of instructions (indicated by a dashed box 1402) is safe and does not affect the outcome of the program or otherwise set up predicates to conditionally execute these instructions. For simplicity, in this example predicates to control/prevent over-execution of kernel code are not shown.

The BNL instructions are branch instructions that signify a branch back to the kernel (i.e., the execute packet shown in cycle 9). Executing a BNL instruction causes a branch (e.g., to the kernel) to be taken until a number of iterations specified by the episkew parameter are complete after the inner and outer loop counters 1308, 1302 have reached zero, in the example where such counters are decremented when advanced. As explained above, every TICK instruction reduces the loop count value by decrementing the inner and outer loop counters 1308, 1302. In one example, the total number of ticks is calculated as: OLCNT value*ILCNT value+EPISKEW. Whether a branch is taken is determined based on whether the ticks counted are less than the total number of ticks calculated, in which case the branch is taken. If the ticks counted are greater than or equal to the total number of ticks calculated, the branch is not taken.

FIGS. 14B and 14C thus represent longhand versions of what would be reduced in size in an instruction store (e.g., instruction cache 121). For example, the instruction store contains the prolog instructions, one instance of the kernel that is repeatedly branched back to until the nested loop controller 1300 inner loop counter 1308 reaches the threshold (e.g., 0) for the final time (e.g., once the outer loop counter 1302 has also reached the threshold, or 0), which occurs in cycle 14 as shown, and the epilog instructions. In the example of FIG. 14C, the epilog instructions are not included as the epilog has been collapsed as explained above.

As explained, in the example of FIG. 14C the epilog is further collapsed. The epilog is functionally equivalent to the kernel, with the only difference being that in each execution of the kernel in place of a collapsed epilog cycle, certain of the instructions do not matter, namely those shown as the dashed box 1402. The episkew parameter and register discussed above take epilog collapsing into account when determining how many BNL instructions to take. The NLCINIT instruction specifies an episkew value, which can be calculated by a compiler (discussed in further detail below) as, for example, a number of TICK instructions before the first BNL instruction minus a number of uncollapsed epilog stages. In the current examples, epilog stages are all a single cycle; however, in other examples, an epilog stage might include multiple cycles. Thus, in FIG. 14B, the number of TICK instructions before the first BNL instruction is 7, while the number of uncollapsed epilog stages is also 7, which results in an episkew parameter of 0. However, in FIG. 14C, the number of TICK instructions before the first BNL instruction is 7, while the number of uncollapsed epilog stages is 0, which results in an episkew parameter of 7.

The nested loop controller 1300 thus permits a simplified approach to generating, storing, and accessing predicate values for controlling execution of instructions in a coalesced nested loop. For example, rather than storing predicate values to registers and loading predicate values from registers, both of which require functional unit overhead, not to mention the complexities of keeping track of which predicate value is located in which register, the TICK instruction is unitless and thus does not monopolize a functional unit. Further, the GETP instruction permits simple indexed access into the predicate FIFO 1312. Still further, the NLCINIT instruction allows loop counts to be simply set, and an episkew counter to be utilized to facilitate collapsing the epilog, further reducing instruction store requirements for a coalesced nested loop.

Referring back to FIGS. 13A and 13B, in some examples an interrupt or exception event may occur during the handling of a nested loop. In response to such an event, the DSP 100 operates to save the nested loop controller 1300, 1350 registers (e.g., the inner loop counter 1308, the outer loop counter 1302, the predicate FIFOs 1312, 1353, the episkew counter 1316, and the inner loop reload register 1304). Once the interrupt or exception event has been handled, the DSP 100 recovers by reloading the registers of the nested loop controller 1300, 1350 from a location in memory pointed to by an event handling pointer, for example.

Figure 15:
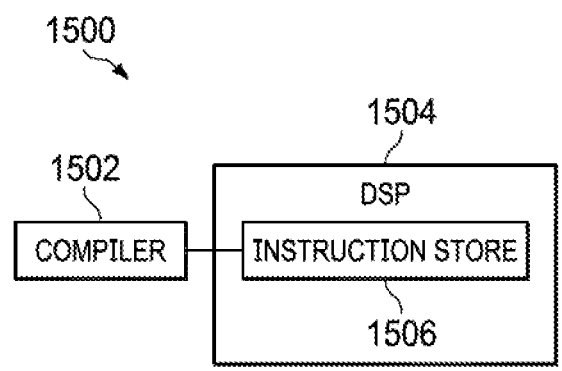
FIG. 15 shows a block diagram of an exemplary system for compiling a nested loop in accordance with various examples.

FIG. 15 shows an exemplary system 1500 for compiling a nested loop in accordance with examples of this disclosure. The system 1500 includes a compiler 1502 that is coupled to a DSP 1504, which may be functionally equivalent to the DSP 100 described above. The DSP 1504 includes an instruction store 1506 that stores assembly- or object-level instructions to be executed by the DSP 1504. The instruction store 1506 may be equivalent or similar to the instruction cache 121 described above.

The compiler 1502 is configured to receive higher-level software code that includes a nested loop, in order to compile the nested loop into assembly- or object-level instructions to be stored in the instruction store 1506 and subsequently executed by the DSP 1504. The compiler 1502 is configured to generate an initialization instruction (e.g., NLCINIT, described above) that is executed prior to the instructions of the nested loop. The initialization instruction initializes a nested loop controller, such as the nested loop controllers 1300, 1350 of FIGS. 13A and 13B, above. In particular, the initialization instruction initializes an outer loop count value (e.g., outer loop counter 1302) and an inner loop count value (e.g., inner loop counter 1308 and/or inner loop reload register 1304), as well as a predicate FIFO (e.g., predicate FIFO 1312, 1353).

The compiler 1502 is also configured to coalesce the nested loop by conditioning or predicating the instructions associated with the outer loop. As a result, at least one predicated instruction in the coalesced nested loop corresponds to an instruction in an outer loop of the nested loop being compiled. The process of coalescing a nested loop is described in further detail above, particularly with respect to FIGS. 14a and 14B.

The compiler 1502 is also configured to generate a TICK instruction for each iteration of the coalesced nested loop, as demonstrated in FIGS. 14a and 14B. As explained above, the TICK instruction advances the inner loop count value (as well as the outer loop count value, for example when the inner loop count value reaches a threshold) and generally controls the advancement of the nested loop controller registers during executing of the coalesced nested loop. The advancing of inner loop count value (and outer loop count value) also populates the predicate FIFOs 1312, 1353 as explained above.

Further, for each predicated instruction in the coalesced nested loop (e.g., corresponding to an outer loop instruction), the compiler 1502 is configured to generate a get predicate instruction (e.g., GETP, described above) including an offset value, which returns a value from the predicate FIFO specified by the offset value. In this way, predicate values are generated, stored, and accessed in a simplified manner. For example, rather than storing predicate values to registers and loading predicate values from registers, both of which require functional unit overhead, not to mention the complexities of keeping track of which predicate value is located in which register, the TICK instruction is unitless and thus does not monopolize a functional unit. Further, the GETP instruction permits simple indexed access into the predicate FIFO 1312, 1353.

As explained above, in some examples certain outer loops in a nested loop may not include any instruction other than the loop control instruction(s). The compiler 1502 may be configured to collapse such outer loops that do not contain instructions. Further, in some cases an epilog of the coalesced nested loop may be collapsed, for example by continuing to branch to the kernel of the coalesced nested loop after the inner loop counter and outer loop counter have reached their threshold values (e.g., 0 in the case of decrementing counter values initialized to inner loop count minus one, and outer loop count minus one, respectively). In this case, the compiler 1502 generates the initialization instruction (e.g., NLCINIT) to initialize the including an episkew value (e.g., episkew counter 1316) that specifies a number of additional iterations, or branches to the kernel, to take once the inner and outer loop counters have reached a threshold value, which is 0 in the current example.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means +/−10 percent of the stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A method, comprising:
   initializing an inner loop counter with an inner loop count value;
   initializing an outer loop counter with an outer loop count value;
   determining an inner loop state based on a comparison of the inner loop count value to an inner loop threshold value;
   determining an outer loop state based on a comparison of the outer loop count value to an outer loop threshold value;
   populating a first buffer with the inner loop state based on the outer loop state;
   executing a get instruction comprising a first offset value, wherein the get instruction returns a value from the first buffer based on the first offset value; and
   determining an outer loop instruction based on the returned value from the first buffer.

2. The method of claim 1, wherein:
   when the outer loop count value equals the outer loop threshold value, the first buffer is not populated.

3. The method of claim 1, wherein:
   the inner loop counter is reset in response to the inner loop count value equaling the inner loop threshold value.

4. The method of claim 1, further comprising:
   populating a second buffer with the outer loop state based on the outer loop count value.

5. The method of claim 4, wherein:
   the get instruction includes a level value.

6. The method of claim 5, wherein:
   the level value corresponds between one of the first buffer and the second buffer.

7. The method of claim 6, further comprising:
   executing the get instruction having a second offset value and level value corresponding to the second buffer, wherein the get instruction returns a value from the second buffer based on the second offset value; and
   determining a third loop instruction based on the returned value from the second buffer.

8. The method of claim 1, further comprising:
   storing the value from the first buffer in a register specified by the get instruction.

9. The method of claim 1, wherein:
   initializing the inner loop counter includes populating the inner loop counter with a first reload value; and
   initializing the outer loop counter includes populating the outer loop counter with a second reload value.

10. The method of claim 9, wherein:
    initializing the inner loop counter includes populating the inner loop counter with a first move constant; and
    initializing the outer loop counter includes populating the outer loop counter with a second move constant.

11. An integrated circuit device comprising:
    an inner loop circuit including:
      a first buffer having a first value associated with an inner loop;
      a first multiplexor coupled to the first buffer and configured to receive the first value from the first buffer and configured to load the first value into an inner loop counter;
      the inner loop counter coupled to the first multiplexor and configured to receive the first value from the first multiplexor;
      a first loop advancer circuit coupled to the inner loop counter and configured to advance the inner loop counter;
      a first comparator coupled to the first loop advancer circuit and configured to generate a first state of the inner loop circuit based on an iteration count of the inner loop; and
      a second buffer coupled to the first comparator and configured to:
        receive the first state of the inner loop circuit;
        store a set of states that includes the first state; and
        output, from among the set of states, the first state of the inner loop circuit in response to a first get instruction.

12. The integrated circuit device of claim 11, further comprising:
- an outer loop circuit including:
    - a second multiplexor configured to receive the first state of the inner loop circuit and a second value associated with an outer loop, the second multiplexor configured to load the second value into an outer loop counter based on the first state of the inner loop circuit;
    - an outer loop counter coupled to the second multiplexor and configured to receive the second value from the second multiplexor;
    - a second loop advancer circuit coupled to the outer loop counter and the second multiplexor, the second loop advancer circuit configured to advance the outer loop counter;
    - a second comparator coupled to the second loop advancer circuit and configured to generate a second state of the outer loop circuit based on an iteration count of the outer loop; and
    - a third buffer coupled to the second comparator and configured to receive the second state of the outer loop circuit and output the second state of the outer loop circuit in response to a second get instruction.

13. The integrated circuit device of claim 12, wherein: the first get instruction includes a first offset value; and the second get instruction includes a second offset value.

14. The integrated circuit device of claim 13, further comprising:
- the second buffer including a first plurality of bits; and
- a third multiplexor coupled to the second buffer and configured to output one of the first plurality of bits in response to the first get instruction.

15. The integrated circuit device of claim 14, further comprising:
- the third buffer including a second plurality of bits; and
- a fourth multiplexor coupled to the third buffer and configured to output one of the second plurality of bits in response to the second get instruction.

16. The integrated circuit device of claim 15, further comprising:
- a fifth multiplexor coupled to the third and fourth multiplexors and configured to output one of the first state of the inner loop circuit or the second state of the outer loop circuit in response to a third get instruction having a third offset value and a level value.

17. An apparatus comprising:
- a first register;
- a first multiplexor having a first input, a second input, and an output, wherein the first input is coupled to the first register;
- an inner loop counter having an input and an output, the input of the inner loop counter coupled to the output of the first multiplexor;
- a first subtractor having an input and an output, the input of the first subtractor coupled to the output of the inner loop counter and the output of the first subtractor coupled to the second input of the first multiplexor, wherein the first subtractor decrements a value of the output of the inner loop counter to produce an iteration count of an inner loop;
- a first comparator having an input and an output, the input of the first comparator coupled to the output of the first subtractor to produce a predicate value based on the iteration count of the inner loop; and
- a second register coupled to the output of the first comparator to store the predicate value.

18. The apparatus of claim 17, further comprising:
- a second multiplexor having a first, second, and third inputs, and an output;
- an outer loop counter having an input and an output, the input of the outer loop counter coupled to the output of the second multiplexor and the output of the outer loop counter coupled to the first input of the second multiplexor;
- a second subtractor having an input and an output, the input of the second subtractor coupled to the output of the outer loop counter and the output of the second subtractor coupled to the second input of the second multiplexor, wherein the second subtractor decrements a value of the output of the outer loop counter;
- a second comparator having an input and an output, the input of the second comparator coupled to the output of the second subtractor and the output of the second comparator coupled to the third input of the second multiplexor; and
- a third register coupled to the output of the second comparator.

19. The apparatus of claim 18, wherein: the output of the first comparator is coupled with the output of the second comparator.

20. The apparatus of claim 18, wherein: the second and third registers include predicate first-in, first-out buffers.

* * * * *